US012606696B2

(12) United States Patent
Garg et al.

(10) Patent No.: US 12,606,696 B2

(45) Date of Patent: Apr. 21, 2026

(54) POLYETHYLENE COMPOSITIONS SUITABLE FOR USE IN CAST STRETCH FILMS

(71) Applicant: Dow Global Technologies LLC, Midland, MI (US)

(72) Inventors: Akanksha Garg, Pearland, TX (US); Jon W. Hobson, Lake Jackson, TX (US); Jose E. Ruiz, Sugar Land, TX (US); Rajen M. Patel, Freeport, TX (US); Jeffrey A. Sims, Lake Jackson, TX (US); Frederik Ter Borg, Terneuzen (NL); Tyler Culp, Richwood, TX (US)

(73) Assignee: Dow Global Technologies LLC, Midland, MI (US)

( * ) Notice: Subject to any disclaimer, the term of this patent is extended or adjusted under 35 U.S.C. 154(b) by 419 days.

(21) Appl. No.: 18/007,070

(22) PCT Filed: Oct. 4, 2021

(86) PCT No.: PCT/US2021/053378

§ 371 (c)(1),
(2) Date: Jan. 27, 2023

(87) PCT Pub. No.: WO2022/081371

PCT Pub. Date: Apr. 21, 2022

(65) Prior Publication Data

US 2023/0331966 A1 Oct. 19, 2023

Related U.S. Application Data

(60) Provisional application No. 63/091,350, filed on Oct. 14, 2020.

(51) Int. Cl.
*C08L 23/06* (2006.01)

(52) U.S. Cl.
CPC .......... *C08L 23/06* (2013.01); *C08L 2203/16* (2013.01); *C08L 2205/025* (2013.01)

(58) Field of Classification Search
CPC .......... C08L 23/04; C08L 23/06; C08L 23/08; C08L 23/0807; C08L 23/0815; C08L 2205/025
See application file for complete search history.

(56) References Cited

U.S. PATENT DOCUMENTS

| | | | |
|---|---|---|---|
| 6,984,695 B2 | 1/2006 | Brown et al. | |
| 9,631,059 B2 | 4/2017 | Demirors et al. | |
| 10,538,654 B2 | 1/2020 | Wang et al. | |
| 2006/0041074 A1 | 2/2006 | Brown et al. | |
| 2017/0029583 A1 | 2/2017 | Lin et al. | |
| 2018/0305530 A1 | 10/2018 | Wang et al. | |
| 2021/0040295 A1* | 2/2021 | Biswas | C08J 3/226 |

FOREIGN PATENT DOCUMENTS

| | | | |
|---|---|---|---|
| WO | 2015157939 | 10/2015 | |
| WO | WO-2015200741 A1 * | 12/2015 | B32B 27/06 |
| WO | WO-2015200742 A1 * | 12/2015 | C08L 23/0815 |
| WO | 2018002196 | 1/2018 | |
| WO | WO-2018018484 A1 * | 2/2018 | C08L 23/16 |
| WO | 2019133368 | 7/2019 | |
| WO | 2020106797 | 5/2020 | |

OTHER PUBLICATIONS

PCT/US2021/053378, International Search Report and Written Opinion with a mailing date of Jan. 18, 2022.

* cited by examiner

*Primary Examiner* — Jeffrey S Lenihan
(74) *Attorney, Agent, or Firm* — Jacob R. Graham

(57) ABSTRACT

Provided are polyethylene compositions and cast stretch films comprising polyethylene compositions. The cast stretch films can exhibit improved tear strength and on pallet benefits while maintaining other properties. The cast stretch films can also be fully compatible with polyethylene recycling streams and can be free of polypropylene.

10 Claims, 5 Drawing Sheets

Dual Parallel Reactor Data Flow Diagram

Dual Series Reactor Data Flow Diagram

POLYETHYLENE COMPOSITIONS SUITABLE FOR USE IN CAST STRETCH FILMS

TECHNICAL FIELD

Embodiments of the present disclosure generally relate to polyethylene compositions, and more particularly relate to polyethylene compositions suitable for use in cast stretch films.

INTRODUCTION

Cast stretch films are high clarity films utilized to protect and unitize manufactured goods or items for transport and storage. It is highly desirable for cast stretch films to have high cross directional tear strength to minimize catastrophic failures during on pallet wrapping. To increase cross directional tear strength, cast stretch films are often formed from polyolefins that comprise a mixture of polypropylene with polyethylene, where polypropylene is added, in part, for an improvement in tear performance. Such films can be difficult to manufacture and difficult, if not impossible, to recycle together due to the different mixture of non-compatible recyclable materials (i.e., polypropylene with polyethylene). As demand for sustainable and recyclable materials continues to rise, there remains a strong need for polyethylene compositions that can form cast stretch films with improved tear strength while maintaining other properties, such as stretchability and puncture properties.

SUMMARY

Embodiments of the present disclosure meet the foregoing needs by providing a polyethylene composition that can be fully recycle-compatible in polyethylene recycling streams and that can be used to form cast stretch films that exhibit improved tear strength properties. The performance of the inventive films can be better than other cast stretch films, such as cast stretch film comprising polyethylene, and for example, can provide better on pallet benefits.

Disclosed herein is a polyethylene composition. In embodiments, the polyethylene composition is characterized by having the following: (a) a density of from 0.910 to 0.945 g/cm$^3$; (b) a melt index ($I_2$) of from 0.5 to 7.0 g/10 min; (c) a first polyethylene fraction having a single peak in a temperature range of from 40° C. to 85° C. in an elution profile via improved comonomer composition distribution (iCCD) analysis method; (d) a second polyethylene fraction having a single peak in a temperature range of from 90° C. to 115° C. in the elution profile via iCCD analysis method, and wherein a second polyethylene area fraction is an area in the elution profile beneath the peak of the second polyethylene fraction between 90° C. and 115° C., and wherein the second polyethylene area fraction comprises at least 30% of the total area of the elution profile, and wherein the width of the peak of the second polyethylene fraction at 50 percent peak height is less than 4.0° C.; and (e) a molecular weighted comonomer distribution index (MWCDI) value of less than 0.

Also disclosed herein is a cast stretch film. In embodiments, the cast stretch film comprises a polyethylene composition characterized by having the following: (a) a density of from 0.910 to 0.945 g/cm$^3$; (b) a melt index ($I_2$) of from 0.5 to 7 g/10 min; (c) a first polyethylene fraction having a single peak in a temperature range of from 40° C. to 85° C. in an elution profile via improved comonomer composition distribution (iCCD) analysis method; (d) a second polyethylene fraction having at least one peak in a temperature range of from 90° C. to 115° C. in the elution profile via iCCD analysis method, and wherein a second polyethylene area fraction is an area in the elution profile beneath the peak of the second polyethylene fraction between 90° C. and 115° C., and wherein the second polyethylene area fraction comprises at least 30% of the total area of the elution profile; and (e) a MWCDI value of less than 0.

These and other embodiments are described in more detail in the Detailed Description.

DETAILED DESCRIPTION

Figure 1:
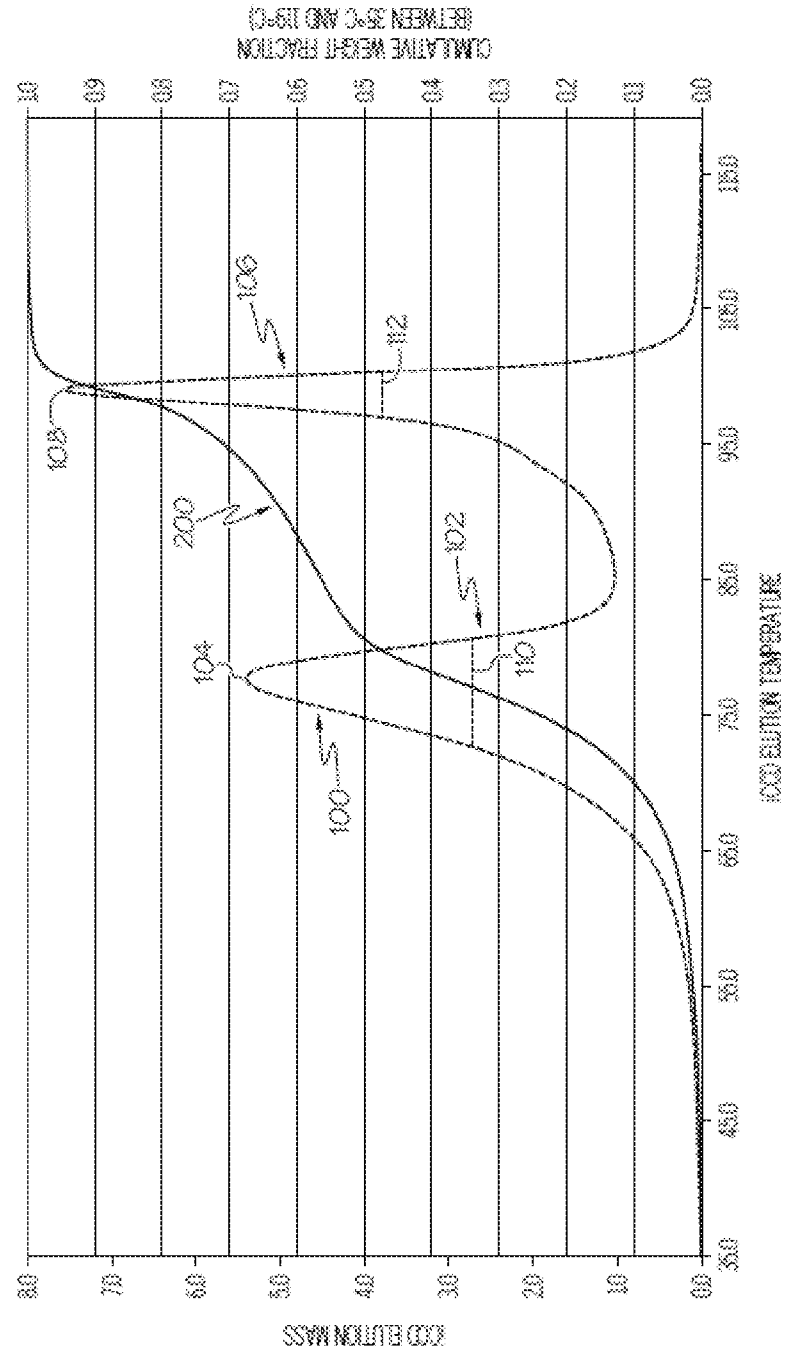
FIG. 1 schematically depicts an iCCD elution profile.

Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

Stretch film is the name given to polyolefin film which can be cold-stretched in the longitudinal and/or transverse direction without the application of heat and which when stretched around a load, can maintain tension for an extended period of time. Cast stretch film can be differentiated from blown stretch film by the method of fabrication. The major differences between cast and blown films are related to cooling methods, film orientation, line speed and gauge control. Cast films typically exhibit better optical properties and a much higher degree of machine direction orientation as compared to blown film. Cast stretch films and film structures having the novel properties described herein can be made using conventional cast film fabrication techniques.

As used herein, the term "polymer" means a polymeric compound prepared by polymerizing monomers, whether of the same or a different type. The generic term polymer thus embraces the term homopolymer (employed to refer to polymers prepared from only one type of monomer), and the term copolymer or interpolymer. Trace amounts of impurities (for example, catalyst residues) may be incorporated into and/or within the polymer. A polymer may be a single polymer, a polymer blend, or a polymer mixture, including mixtures of polymers that are formed in situ during polymerization.

As used herein, the terms "polyethylene" or "ethylene-based polymer" shall mean polymers comprising a majority amount (>50 mol %) of units which have been derived from ethylene monomer. This includes polyethylene homopolymers or copolymers (meaning units derived from two or more comonomers).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Polyethylene Composition

A polyethylene composition is disclosed herein. In embodiments, the polyethylene composition is characterized by having a density of from 0.910 to 0.945 g/cm$^3$. All individual values and subranges of from 0.910 to 0.945 g/cm$^3$ are disclosed and included herein. For example, the polyethylene composition can have a density of from 0.910 to 0.940 g/cm$^3$, 0.910 to 0.935 g/cm$^3$, 0.910 to 0.930 g/cm$^3$, 0.910 to 0.925 g/cm$^3$, 0.915 to 0.945 g/cm$^3$, 0.915 to 0.940 g/cm$^3$, 0.915 to 0.935 g/cm$^3$, 0.915 to 0.930 g/cm$^3$, 0.915 to 0.925 g/cm$^3$, or 0.915 to 0.920 g/cm$^3$.

In embodiments, the polyethylene composition is also characterized by having a melt index ($I_2$) of from 0.5 to 7.0 g/10 min. All individual values and subranges of from 0.5 to 7.0 g/10 min are disclosed and included herein. For example, the polyethylene composition can have a melt index ($I_2$) of from 0.5 to 6.0 g/10 min, from 0.5 to 4.0 g/10 min, from 0.5 to 2.0 g/10 min, from 0.8 to 6.0 g/10 min, from 0.8 to 4.0 g/10 min, from 0.8 to 2.0 g/10 min, from 0.8 to 1.8 g/10 min, from 1.0 to 7.0 g/10 min, from 1.0 to 6.0 g/10 min, from 1.0 to 4.0 g/10 min, or from 1.0 to 2.0 g/10 min.

In embodiments, the polyethylene composition is also characterized by having a first polyethylene fraction and a second polyethylene fraction. As described herein, a polyethylene "fraction" refers to a portion of the total composition of the polyethylene composition. The presently disclosed embodiments include at least a "first polyethylene fraction" and a "second polyethylene fraction." The fractions included in the polyethylene composition may be quantified by their temperature range in an elution profile via improved comonomers composition distribution (iCCD) analysis method. Unless specified, any elution profile referred to herein is the elution profile observed via iCCD. Examples of such fractions will be better understood in view of the examples provided herewith. In general, the first fraction may include a single peak in the temperature range of the first fraction and the second fraction may include a single peak in the temperature range of the second fraction. The polyethylene compositions described herein may be referred to as "multimodal," meaning that they include at least two peaks in their elution profile. Some embodiments may be "bimodal," meaning that two major peaks are present.

In reference to the described iCCD distribution, FIG. 1 schematically depicts a sample iCCD distribution 100 along with the cumulative weight fraction curve 200. FIG. 1 depicts, generally, several features of the iCCD profiles of the presently described polyethylene compositions, such as the first fraction, the second fraction, half peak widths, etc., which are discussed in detail herein. As such, FIG. 1 can be used as a reference with respect to the disclosures related to the iCCD profile provided herein. Specifically, the first fraction 102 and second fraction 106 are depicted. The first fraction 102 has a peak 104 and the second fraction 106 has a peak 108. Each fraction has a half peak width (i.e., width of the peak at 50 percent peak height) 110 and 112. It should be understood that the profile of FIG. 1 is not derived from experimentation or observation, but is instead supplied for informational purposes of describing particular features of an iCCD elution profile.

In embodiments, the polyethylene composition is characterized by having a first polyethylene fraction. The first polyethylene fraction may have a single peak in a temperature range of from 40° C. to 85° C. in an elution profile via iCCD analysis method. As used herein, a "single peak" refers to an iCCD wherein a particular fraction includes only a single peak. That is, in some embodiments, the iCCD of the first and second polyethylene fraction includes only an upward sloping region followed by a downward sloping region to form the single peak. It should be understood that a peak in the first or second polyethylene fraction may not be formed by a local minimum in the respective polyethylene fraction at a defined temperature boundary. That is, the peak must be a peak in the context of the entire spectrum, not a peak formed by the threshold temperature of a polyethylene fraction. For example, if a single peak followed by a single valley were present in a polyethylene fraction (an upward slope followed by a downward slope followed by an upward slope), only a single peak would be present in such a polyethylene fraction.

In embodiments, the polyethylene composition is characterized by having a second polyethylene fraction. The second polyethylene fraction may have a single peak in a temperature range of from 90° C. to 115° C. in an elution profile via iCCD analysis method. In embodiments, the width of the single peak of the second polyethylene fraction at 50 percent peak height may be less than 4.0° C., less than 3.5° C., less than 3.0° C., or even less than 2.5° C. Generally, lesser temperature ranges at 50 percent peak heights correspond to a "sharper" peak. Without being bound by any particular theory, it is believed that a "sharper" or "narrower" peak is a characteristic caused by the molecular catalyst and indicates minimum comonomer incorporation on the higher density fraction, enabling higher density split between the two fractions.

In embodiments, a first polyethylene area fraction is the area in the elution profile beneath the single peak of the first polyethylene fraction between 40° C. and 85° C. Similarly, a second polyethylene area fraction is the area in the elution profile beneath the single peak of the second polyethylene fraction between 90° C. and 115° C. The first polyethylene area fraction and the second polyethylene fraction, respectively, may correspond with the total relative mass of each polymer fraction in the polyethylene composition. In embodiments, the second polyethylene area fraction comprises at least 30% of the total area of the elution profile. For example, the second polyethylene area fraction can comprise at least 30%, at least 32%, at least 33%, at least 35%, at least 40%, at least 45%, at least 50%, at least 55%, or even at least 60% of the total area of the iCCD elution profile, or can comprise from 30% to 65%, from 30% to 60%, from 30% to 55%, from 30% to 50%, from 35% to 65%, from 35% to 50%, from 40% to 65%, or from 40% to 60% of the total area of the elution profile.

In embodiments, the second polyethylene fraction of the polyethylene composition may have a weight average molecular weight (Mw) of at least 95,000 g/mol. All individual values and subranges of at least 95,000 g/mol are disclosed and included herein. For example, the second polyethylene fraction can have a weight average molecular weight (Mw) of at least 95,000 g/mol, at least 100,000 g/mol, at least 120,000 g/mol, at least 160,000 g/mol, or at least 200,000 g/mol, or can have a weight average molecular weight (Mw) in the range of from 95,000 g/mol to 260,000 g/mol, from 100,000 g/mol to 250,000 g/mol, or from 100,000 g/mol to 220,000 g/mol. Molecular weight of the polyethylene fractions may be calculated based on GPC results, as described hereinbelow.

In embodiments, the polyethylene composition is also characterized by having a molecular weighted comonomer distribution index (MWCDI) of less than 0. All individual values and subranges of less than 0 are disclosed and incorporated herein. For example, the polyethylene composition can have a MWCDI of less than 0, less than −1, less than −2, less than −3, less than −4, less than −5, or less than −6, or can have a MWCDI in the range of from 0 to −15, from −1 to −12, from −2 to −10, or from −3 to −8, where MWCDI can be measured in accordance with the test method described below.

In embodiments, the polyethylene composition may be further characterized by having a molecular weight distribution, expressed as the ratio of the weight average molecular weight to number average molecular weight (Mw/Mn), in the range of from 2.0 to 8.0. In additional embodiments, the molecular weight distribution (Mw/Mn) may be from 2.0 to 7.0, from 2.0 to 6.0, from 2.0 to 5.0, from 2.5 to 7.0, from 2.5 to 6.0, or from 2.5 to 5.0. Molecular weight distribution (Mw/Mn) of the polyethylene composition may be calculated based on GPC, as described hereinbelow.

In embodiments, the polyethylene composition may further be characterized by having a zero shear viscosity ratio (ZSVR) of less than 3.0. For example, the polyethylene composition may have a zero shear viscosity ratio of less than 2.9, less than 2.8, less than 2.7, less than 2.6, less than 2.5, less than 2.4, less than 2.3, less than 2.2, less than 2.1, less than 2.0, less than 1.9, less than 1.8, less than 1.7, less than 1.6, less than 1.5, less than 1.4, less than 1.3, less than 1.2, or even less than 1.1. In one or more embodiments, the polyethylene composition may have a zero shear viscosity ratio of at least 1.0. ZSVR of the polyethylene composition can be measured in accordance with the test method described hereinbelow.

Blends or mixtures of the polyethylene composition with other polyolefins may be formed. Suitable polymers for blending with the inventive polyethylene compositions include thermoplastic and non-thermoplastic polymers including natural and synthetic polymers. Exemplary polymers for blending include polypropylene, (both impact modifying polypropylene, isotactic polypropylene, atactic polypropylene, and random ethylene/propylene copolymers), various types of polyethylene (PE), including high pressure, free-radical low density polyethylene (LDPE), Ziegler-Natta linear low density polyethylene (LLDPE), metallocene PE, including multiple reactor PE ("in reactor" blends of Ziegler-Natta PE and metallocene PE, such as products disclosed in U.S. Pat. No. 6,545,088 (Kolthammer, et al.); U.S. Pat. No. 6,538,070 (Cardwell, et al.); U.S. Pat. No. 6,566,446 (Parikh, et al.); U.S. Pat. No. 5,844,045 (Kolthammer, et al.); U.S. Pat. No. 5,869,575 (Kolthammer, et al.); and U.S. Pat. No. 6,448,341 (Kolthammer, et al.), ethylene-vinyl acetate (EVA), ethylene/vinyl alcohol copolymers, polystyrene, impact modified polystyrene, Acrylonitrile-Butadiene-Styrene (ABS), styrene/butadiene block copolymers and hydrogenated derivatives thereof (Styrene-Butadiene-Styrene (SBS) and Styrene-Ethylene-Butadiene-Styrene (SEBS)), and thermoplastic polyurethanes. Homogeneous polymers such as olefin plastomers and elastomers, ethylene and propylene-based copolymers (for example, polymers available under the trade designation VERSIFY™ Plastomers & Elastomers (The Dow Chemical Company), SURPASS™ (Nova Chemicals), and VISTAMAXX™ (ExxonMobil Chemical Co.)) can also be useful as components in blends comprising the inventive polyethylene compositions. Suitable polymers to mix with the polyethylene composition disclosed herein include, in embodiments, LDPE and LLDPE, such as, for example, AGILITY 1200 (manufactured by The Dow Chemical Company).

In embodiments, the presently disclosed polyethylene compositions may further comprise additional components such as one or more additives. Such additives include, but are not limited to, antistatic agents, color enhancers, dyes, lubricants, fillers such as $TiO_2$ or $CaCO_3$, opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. The polyethylene compositions may contain from about 0.1 to about 10 percent by the combined weight of such additives, based on the weight of the polyethylene composition including such additives.

In embodiments, the first polyethylene fraction of the polyethylene composition may be formed in the presence of a first molecular catalyst and the second polyethylene fraction of the polyethylene composition may be formed in the presence of a second molecular catalyst. The first molecular catalyst and the second molecular catalyst may be the same or different catalysts. In other embodiments, the first polyethylene fraction of the polyethylene composition may be formed in the presence of a molecular catalyst and the second polyethylene fraction of the polyethylene composition may be formed in the presence of a Ziegler-Natta catalyst. The polymerization and catalyst system for forming the polyethylene composition according to embodiments disclosed herein are described in more detail hereinbelow. In general, molecular catalysts are homogeneous polymerization catalysts which comprise (a) a transition metal, (b) one or more non-substituted or substituted cyclopentadienyl ligands, and/or (c) one or more ligands containing at least one heteroatom, such as, oxygen, nitrogen, phosphorus, and/or sulfur. Molecular catalyst may be immobilized on an inorganic support, such as silica, alumina, or $MgCl_2$.

Polymerization

Any conventional polymerization processes may be employed to produce the polyethylene compositions described herein. Such conventional polymerization processes include, but are not limited to, slurry polymerization processes, solution polymerization process, using one or more conventional reactors, e.g., loop reactors, isothermal reactors, stirred tank reactors, batch reactors in parallel, series, and/or any combinations thereof. The polyethylene composition may, for example, be produced via solution phase polymerization process using one or more loop reactors, isothermal reactors, and combinations thereof.

In general, the solution phase polymerization process may occur in one or more well-mixed reactors such as one or more isothermal loop reactors or one or more adiabatic reactors at a temperature in the range of from 115 to 250° C. (e.g., from 115 to 210° C.), and at pressures in the range of from 300 to 1,000 psi (e.g., from 400 to 800 psi). In some embodiments, in a dual reactor, the temperature in the first reactor is in the range of from 115 to 190° C. (e.g., from 160 to 180° C.), and the second reactor temperature is in the range of 150 to 250° C. (e.g., from 180 to 220° C.). In other embodiments, in a single reactor, the temperature in the reactor is in the range of from 115 to 250° C. (e.g., from 115 to 225° C.).

The residence time in solution phase polymerization process may be in the range of from 2 to 30 minutes (e.g., from 5 to 25 minutes). Ethylene, solvent, hydrogen, one or more catalyst systems, optionally one or more cocatalysts, and optionally one or more comonomers are fed continuously to one or more reactors. Exemplary solvents include, but are not limited to, isoparaffins. For example, such solvents are commercially available under the name ISOPAR E from ExxonMobil Chemical Co., Houston, Texas. The resultant mixture of the polyethylene composition and solvent is then removed from the reactor and the polyethylene composition is isolated. Solvent is typically recovered via a solvent recovery unit, e.g., heat exchangers and vapor liquid separator drum, and is then recycled back into the polymerization system.

In some embodiments, the polyethylene composition may be produced via solution polymerization in a dual reactor system, for example a dual loop reactor system, wherein ethylene is polymerized in the presence of one or more catalyst systems. In some embodiments, only ethylene is polymerized. Additionally, one or more cocatalysts may be present. In another embodiment, the polyethylene composition may be produced via solution polymerization in a single reactor system, for example a single loop reactor system, wherein ethylene is polymerized in the presence of two catalyst systems. In some embodiments, only ethylene is polymerized.

Catalyst Systems

Specific embodiments of catalyst systems that can, in one or more embodiments, be used to produce the polyethylene composition described herein will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

The term "independently selected" is used herein to indicate that the R groups, such as, $R^1$, $R^2$, $R^3$, $R^4$, and $R^5$ can be identical or different (e.g., $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name. These definitions are intended to supplement and illustrate, not preclude, the definitions known to those of skill in the art.

The term "procatalyst" refers to a compound that has catalytic activity when combined with an activator. The term "activator" refers to a compound that chemically reacts with a procatalyst in a manner that converts the procatalyst to a catalytically active catalyst. As used herein, the terms "cocatalyst" and "activator" are interchangeable terms.

When used to describe certain carbon atom-containing chemical groups, a parenthetical expression having the form "($C_x$-$C_y$)" means that the unsubstituted form of the chemical group has from x carbon atoms to y carbon atoms, inclusive of x and y. For example, a ($C_1$-$C_{40}$)alkyl is an alkyl group having from 1 to 40 carbon atoms in its unsubstituted form. In some embodiments and general structures, certain chemical groups may be substituted by one or more substituents such as $R^S$. An $R^S$ substituted version of a chemical group defined using the "($C_x$-$C_y$)" parenthetical may contain more than y carbon atoms depending on the identity of any groups $R^S$. For example, a "($C_1$-$C_{40}$)alkyl substituted with exactly one group $R^S$, where $R^S$ is phenyl (—$C_6H_5$)" may contain from 7 to 46 carbon atoms. Thus, in general when a chemical group defined using the "($C_x$-$C_y$)" parenthetical is substituted by one or more carbon atom-containing substituents $R^S$, the minimum and maximum total number of carbon atoms of the chemical group is determined by adding to both x and y the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or function group is replaced by a substituent (e.g. $R^S$). The term "persubstitution" means that every hydrogen atom (H) bonded to a carbon atom or heteroatom of a corresponding unsubstituted compound or functional group is replaced by a substituent (e.g., $R^S$). The term "polysubstitution" means that at least two, but fewer than all, hydrogen atoms bonded to carbon atoms or heteroatoms of a corresponding unsubstituted compound or functional group are replaced by a substituent.

The term "—H" means a hydrogen or hydrogen radical that is covalently bonded to another atom. "Hydrogen" and "—H" are interchangeable, and unless clearly specified mean the same thing.

The term "($C_1$-$C_{40}$)hydrocarbyl" means a hydrocarbon radical of from 1 to 40 carbon atoms and the term "($C_1$-$C_{40}$)hydrocarbylene" means a hydrocarbon diradical of from 1 to 40 carbon atoms, in which each hydrocarbon radical and each hydrocarbon diradical is aromatic or non-aromatic, saturated or unsaturated, straight chain or branched chain, cyclic (including mono- and poly-cyclic, fused and non-fused polycyclic, including bicyclic; 3 carbon atoms or more) or acyclic and is unsubstituted or substituted by one or more $R^S$.

In this disclosure, a ($C_1$-$C_{40}$)hydrocarbyl can be an unsubstituted or substituted ($C_1$-$C_{40}$)alkyl, ($C_3$-$C_{40}$)cycloalkyl, ($C_3$-$C_{20}$)cycloalkyl-($C_1$-$C_{20}$)alkylene, ($C_6$-$C_{40}$)aryl, or ($C_6$-$C_{20}$)aryl-($C_1$-$C_{20}$)alkylene. In some embodiments, each of the aforementioned ($C_1$-$C_{40}$)hydrocarbyl groups has a maximum of 20 carbon atoms (i.e., ($C_1$-$C_{20}$)hydrocarbyl) and other embodiments, a maximum of 12 carbon atoms.

The terms "($C_1$-$C_{40}$)alkyl" and "($C_1$-$C_{18}$)alkyl" mean a saturated straight or branched hydrocarbon radical of from 1 to 40 carbon atoms or from 1 to 18 carbon atoms, respectively, that is unsubstituted or substituted by one or more $R^S$. Examples of unsubstituted ($C_1$-$C_{40}$)alkyl are unsubstituted ($C_1$-$C_{20}$)alkyl; unsubstituted ($C_1$-$C_{10}$)alkyl; unsubstituted ($C_1$-$C_5$)alkyl; methyl; ethyl; 1-propyl; 2-propyl; 1-butyl; 2-butyl; 2-methylpropyl; 1,1-dimethylethyl; 1-pentyl; 1-hexyl; 1-heptyl; 1-nonyl; and 1-decyl. Examples of substituted ($C_1$-$C_{40}$)alkyl are substituted ($C_1$-$C_{20}$)alkyl, substituted ($C_1$-$C_{10}$)alkyl, trifluoromethyl, and [$C_{45}$]alkyl. The term "[$C_{45}$]alkyl" (with square brackets) means there is a maximum of 45 carbon atoms in the radical, including substituents, and is, for example, a ($C_{27}$-$C_{40}$)alkyl substituted by one $R^S$, which is a ($C_1$-$C_5$)alkyl, respectively. Each ($C_1$-$C_5$)alkyl may be methyl, trifluoromethyl, ethyl, 1-propyl, 1-methylethyl, or 1,1-dimethylethyl.

The term "($C_6$-$C_{40}$)aryl" means an unsubstituted or substituted (by one or more $R^S$) mono-, bi- or tricyclic aromatic hydrocarbon radical of from 6 to 40 carbon atoms, of which at least from 6 to 14 of the carbon atoms are aromatic ring carbon atoms, and the mono-, bi- or tricyclic radical comprises 1, 2, or 3 rings, respectively; wherein the 1 ring is aromatic and the 2 or 3 rings independently are fused or non-fused and at least one of the 2 or 3 rings is aromatic. Examples of unsubstituted ($C_6$-$C_{40}$)aryl are unsubstituted ($C_6$-$C_{20}$)aryl unsubstituted ($C_6$-$C_{18}$)aryl; 2-($C_1$-$C_5$)alkyl-phenyl; 2,4-bis($C_1$-$C_5$)alkyl-phenyl; phenyl; fluorenyl; tetrahydrofluorenyl; indacenyl; hexahydroindacenyl; indenyl;

dihydroindenyl; naphthyl; tetrahydronaphthyl; and phenanthrene. Examples of substituted $(C_6-C_{40})$aryl are substituted $(C_1-C_{20})$aryl; substituted $(C_6-C_{18})$aryl; 2,4-bis[$(C_{20})$alkyl]-phenyl; polyfluorophenyl; pentafluorophenyl; and fluoren-9-one-1-yl.

The term "$(C_3-C_{40})$cycloalkyl" means a saturated cyclic hydrocarbon radical of from 3 to 40 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{40})$hydrocarbylene include unsubstituted or substituted $(C_6-C_{40})$arylene, $(C_3-C_{40})$cycloalkylene, and $(C_1-C_{40})$alkylene (e.g., $(C_1-C_{20})$alkylene). In some embodiments, the diradicals are on the same carbon atom (e.g., $—CH_2—$) or on adjacent carbon atoms (i.e., 1,2-diradicals), or are spaced apart by one, two, or more than two intervening carbon atoms (e.g., respective 1,3-diradicals, 1,4-diradicals, etc.). Some diradicals include α,ω-diradical. The α,ω-diradical is a diradical that has maximum carbon backbone spacing between the radical carbons. Some examples of $(C_2-C_{20})$alkylene α,ω-diradicals include ethan-1,2-diyl (i.e. $—CH_2CH_2—$), propan-1,3-diyl (i.e. $—CH_2CH_2CH_2—$), 2-methylpropan-1,3-diyl (i.e. $—CH_2CH(CH_3)CH_2—$). Some examples of $(C_6-C_{50})$ arylene α,ω-diradicals include phenyl-1,4-diyl, napthalen-2,6-diyl, or napthalen-3,7-diyl.

The term "$(C_1-C_{40})$alkylene" means a saturated straight chain or branched chain diradical (i.e., the radicals are not on ring atoms) of from 1 to 40 carbon atoms that is unsubstituted or substituted by one or more $R^S$. Examples of unsubstituted $(C_1-C_{50})$alkylene are unsubstituted $(C_1-C_{20})$alkylene, including unsubstituted $—CH_2CH_2—$, $—(CH_2)_3—$, $—(CH_2)_4—$, $(CH_2)_5—$, $—(CH_2)_6—$, $—(CH_2)_7—$, $—(CH_2)_8—$, $—CH_2C^*HCH_3$, and $—(CH_2)_4C^*(H)(CH_3)$, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, $—CF_2—$, $—C(O)—$, and $—(CH_2)_{14}C(CH_3)_2(CH_2)_8—$ (i.e., a 6,6-dimethyl substituted normal-1,20-eicosylene). Since as mentioned previously two $R^S$ may be taken together to form a $(C_1-C_{18})$ alkylene, examples of substituted $(C_1-C_{50})$alkylene also include 1,2-bis(methylene)cyclopentane, 1,2-bis(methylene)cyclohexane, 2,3-bis(methylene)-7,7-dimethyl-bicyclo[2.2.1]heptane, and 2,3-bis(methylene) bicyclo[2.2.2]octane.

The term "$(C_3-C_{40})$cycloalkylene" means a cyclic diradical (i.e., the radicals are on ring atoms) of from 3 to 40 carbon atoms that is unsubstituted or substituted by one or more $R^S$.

The term "heteroatom," refers to an atom other than hydrogen or carbon. Examples of heteroatoms include O, S, S(O), $S(O)_2$, $Si(R^C)_2$, $P(R^P)$, $N(R^N)$, $—N{=}C(R^C)_2$, $—Ge(R^C)_2—$, or $—Si(R^C)—$, where each $R^C$, each $R^N$, and each $R^P$ is unsubstituted $(C_1-C_{18})$hydrocarbyl or —H. The term "heterohydrocarbon" refers to a molecule or molecular framework in which one or more carbon atoms are replaced with a heteroatom. The term "$(C_1-C_{40})$heterohydrocarbyl" means a heterohydrocarbon radical of from 1 to 40 carbon atoms and the term "$(C_1-C_{40})$heterohydrocarbylene" means a heterohydrocarbon diradical of from 1 to 40 carbon atoms, and each heterohydrocarbon has one or more heteroatoms. The radical of the heterohydrocarbyl is on a carbon atom or a heteroatom, and diradicals of the heterohydrocarbyl may be on: (1) one or two carbon atom, (2) one or two heteroatoms, or (3) a carbon atom and a heteroatom. Each $(C_1-C_{50})$ heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and polycyclic, fused and non-fused polycyclic), or acyclic.

The $(C_1-C_{40})$heterohydrocarbyl may be unsubstituted or substituted $(C_1-C_{40})$heteroalkyl, $(C_1-C_{40})$hydrocarbyl-O—, $(C_1-C_{40})$hydrocarbyl-S—, $(C_1-C_{40})$hydrocarbyl-S(O)—, $(C_1-C_{40})$hydrocarbyl-$S(O)_2$—, $(C_1-C_{40})$hydrocarbyl-$Si(R^C)_2$—, $(C_1-C_{40})$hydrocarbyl-$N(R^N)$—, $(C_1-C_{40})$hydrocarbyl-$P(R^P)$—, $(C_2-C_{40})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{40})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene.

The term "$(C_4-C_{40})$heteroaryl" means an unsubstituted or substituted (by one or more $R^S$) mono-, bi- or tricyclic heteroaromatic hydrocarbon radical of from 4 to 40 total carbon atoms and from 1 to 10 heteroatoms, and the mono-, bi- or tricyclic radical comprises 1, 2 or 3 rings, respectively, wherein the 2 or 3 rings independently are fused or non-fused and at least one of the 2 or 3 rings is heteroaromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered or 6-membered ring. The 5-membered ring has 5 minus h carbon atoms, wherein h is the number of heteroatoms and may be 1, 2, or 3; and each heteroatom may be O, S, N, or P. Examples of 5-membered ring heteroaromatic hydrocarbon radical are pyrrol-1-yl; pyrrol-2-yl; furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1 or 2 and the heteroatoms may be N or P. Examples of 6-membered ring heteroaromatic hydrocarbon radical are pyridine-2-yl; pyrimidin-2-yl; and pyrazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazole-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f]indol-1-yl. An example of the fused 6,5,6-ring system is 9H-carbazol-9-yl. An example of the fused 6,5,6-ring system is 9H-carbazol-9-yl. An example of the fused 6,6,6-ring system is acrydin-9-yl.

The aforementioned heteroalkyl may be saturated straight or branched chain radicals containing $(C_1-C_{50})$ carbon atoms, or fewer carbon atoms and one or more of the heteroatoms. Likewise, the heteroalkylene may be saturated straight or branched chain diradicals containing from 1 to 50 carbon atoms and one or more than one heteroatoms. The heteroatoms, as defined above, may include $Si(R^C)_3$, $Ge(R^C)_3$, $Si(R^C)_2$, $Ge(R^C)_2$, $P(R^P)_2$, $P(R^P)$, $N(R^N)_2$, $N(R^N)$, N, O, $OR^C$, S, $SR^C$, S(O), and $S(O)_2$, wherein each of the heteroalkyl and heteroalkylene groups are unsubstituted or substituted by one or more $R^S$.

Examples of unsubstituted ($C_2$-$C_{40}$)heterocycloalkyl are unsubstituted ($C_2$-$C_{20}$)heterocycloalkyl, unsubstituted ($C_2$-$C_{10}$)heterocycloalkyl, aziridin-1-yl, oxetan-2-yl, tetrahydrofuran-3-yl, pyrrolidin-1-yl, tetrahydrothiophen-S,S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorous, and carbon-silicon double bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, and (in heteroatom-containing groups) carbon-nitrogen, carbon-phosphorous, and carbon-silicon double bonds, not including any such double bonds that may be present in substituents $R^S$, if any, or in (hetero) aromatic rings, if any.

According to some embodiments, a catalyst system for producing a polyethylene composition includes a metal-ligand complex according to formula (I):

(I)

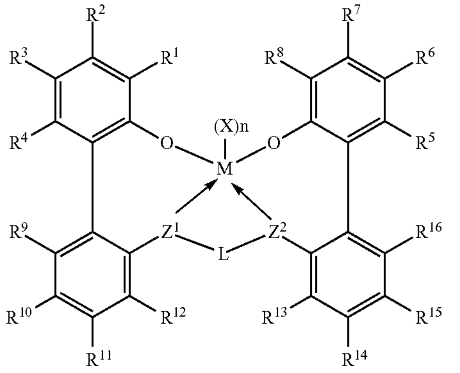

In formula (I), M is a metal chosen from titanium, zirconium, or hafnium, the metal being in a formal oxidation state of +2, +3, or +4; n is 0, 1, or 2; when n is 1, X is a monodentate ligand or a bidentate ligand; when n is 2, each X is a monodentate ligand and is the same or different; the metal-ligand complex is overall charge-neutral; each Z is independently chosen from —O—, —S—, —$N(R^N)$—, or —$P(R^P)$—; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 1-carbon atom to 10-carbon atom linker backbone linking the two Z groups in Formula (I) (to which L is bonded) or the ($C_1$-$C_{40}$)heterohydrocarbylene has a portion that comprises a 1-atom to 10-atom linker backbone linking the two Z groups in Formula (I), wherein each of the 1 to 10 atoms of the 1-atom to 10-atom linker backbone of the ($C_1$-$C_{40}$)heterohydrocarbylene independently is a carbon atom or heteroatom, wherein each heteroatom independently is O, S, S(O), $S(O)_2$, $Si(R^C)_2$, $Ge(R^C)_2$, $P(R^C)$, or $N(R^C)$, wherein independently each $R^C$ is ($C_1$-$C_{30}$)hydrocarbyl or ($C_1$-$C_{30}$)heterohydrocarbyl; $R^1$ and $R^8$ are independently selected from the group consisting of —H, ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$OR^C$, —$SR^C$, —$NO_2$, —CN, —$CF_3$, $R^CS(O)$—, $R^CS(O)_2$—, $(R^C)_2C{=}N$—, $R^CC(O)O$—, $R^COC(O)$—, $R^CC(O)N(R^N)$—, $(R^N)_2NC(O)$—, halogen, and radicals having formula (II), formula (III), or formula (IV):

(II)

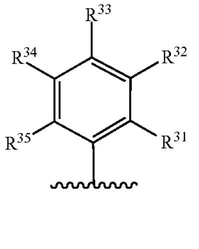

(III)

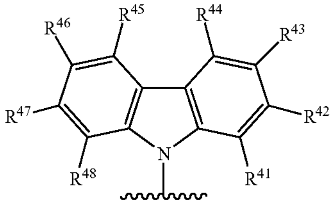

(IV)

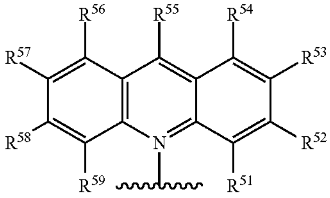

In formulas (II), (III), and (IV), each of $R^{31-35}$, $R^{41-48}$, or $R^{51-59}$ is independently chosen from ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$N{=}CHR^C$, —$OR^C$, —$SR^C$, —$NO_2$, —CN, —$CF_3$, $R^CS(O)$—, $R^CS(O)_2$—, $(R^C)_2C{=}N$—, $R^CC(O)O$—, $R^COC(O)$—, $R^CC(O)N(R^N)$—, $(R^N)_2NC(O)$—, halogen, or —H, provided at least one of $R^1$ or $R^8$ is a radical having formula (II), formula (III), or formula (IV).

In formula (I), each of $R^{2-4}$, $R^{5-7}$, and $R^{9-16}$ is independently selected from ($C_1$-$C_{40}$)hydrocarbyl, ($C_1$-$C_{40}$)heterohydrocarbyl, —$Si(R^C)_3$, —$Ge(R^C)_3$, —$P(R^P)_2$, —$N(R^N)_2$, —$N{=}CHR^C$, —$OR^C$, —$SR^C$, —$NO_2$, —CN, —$CF_3$, $R^CS(O)$—, $R^CS(O)_2$—, $(R^C)_2C{=}N$—, $R^CC(O)O$—, $R^COC(O)$—, $R^CC(O)N(R^N)$—, $(R^C)_2NC(O)$—, halogen, and —H.

In some embodiments, the polyethylene composition is formed using a first catalyst according to formula (I) in a first reactor and a different catalyst according to formula (I) in a second reactor.

In one exemplary embodiment where a dual loop reactor is used, the procatalyst used in the first loop is zirconium, [[2,2"-[[bis[1-methylethyl) germylene]bis(methyleneoxy-κO)]bis[3",5,5"-tris(1,1-dimethylethyl)-5'-octyl[1,1':3',1"-terphenyl]-2'-olato-κO]](2-)]dimethyl-, having the chemical formula $C_{86}H_{128}F_2GeO_4Zr$ and the following structure (V):

(V)

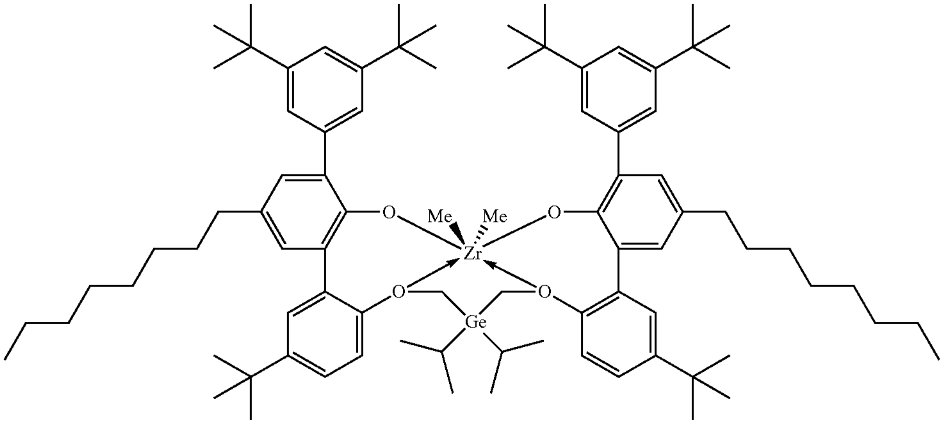

In such an embodiment, the procatalyst used in the second loop is zirconium, [[2,2'''-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-κO]](2-)]dimethyl, having the chemical formula $C_{107}H_{154}N_2O_4Si_2Zr$ and the following structure (VI):

(VI)

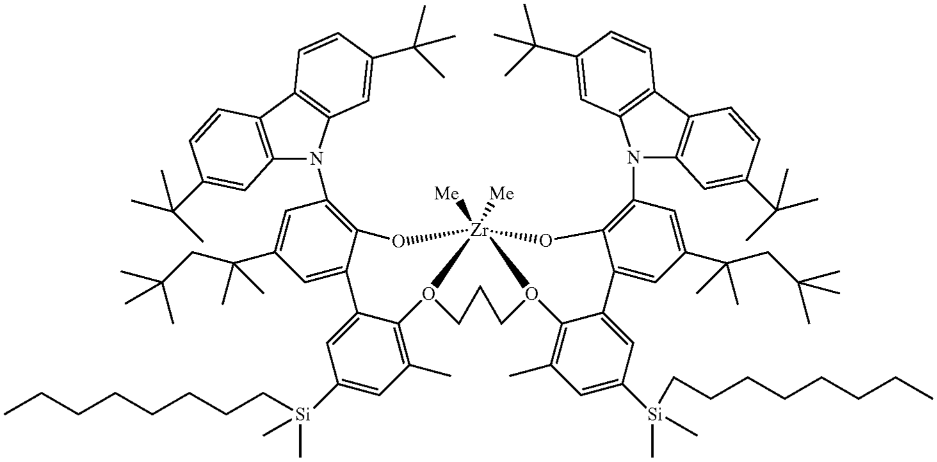

In another embodiment, the procatalyst used in the second loop is hafnium, [[2,2"-[1,3-propanediylbis(oxy-κO)]bis[3-[2,7-bis(1,1-dimethylethyl)-9H-carbazol-9-yl]]-5'-(dimethyloctylsilyl)-3'-methyl-5-(1,1,3,3-tetramethylbutyl)[1,1]-biphenyl]-2-olato-κO]](2-)]dimethyl, having the chemical formula C107H154N2O4Si2Zr and the following structure (VII):

methylammonium tetrakis(pentafluorophenyl) borane). As used herein, the term "ammonium" means a nitrogen cation that is a $((C_1\text{-}C_{20})\text{hydrocarbyl})_4N^+$ a $((C_1\text{-}C_{20})\text{hydrocarbyl})_3N(H)^+$, a $((C_1\text{-}C_{20})\text{hydrocarbyl})_2N(H)_2^+$, $(C_1\text{-}C_{20})$hydrocarbylN$(H)_3^+$, or $N(H)_4^+$, wherein each $(C_1\text{-}C_{20})$hydrocarbyl, when two or more are present, may be the same or different.

(VII)

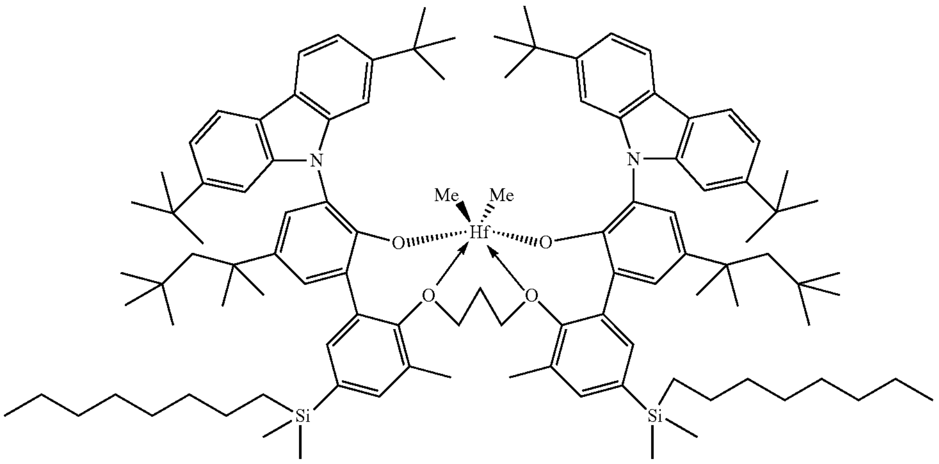

Co-Catalyst Component

The catalyst system comprising a metal-ligand complex of formula (I) may be rendered catalytically active by any technique known in the art for activating metal-based catalysts of olefin polymerization reactions. For example, the system comprising a metal-ligand complex of formula (I) may be rendered catalytically active by contacting the complex to, or combining the complex with, an activating co-catalyst. Suitable activating co-catalysts for use herein include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Examples of polymeric or oligomeric alumoxanes include methylalumoxane, triisobutylaluminum-modified methylalumoxane, and isobutylalumoxane.

Lewis acid activators (co-catalysts) include Group 13 metal compounds containing from 1 to 3 $(C_1\text{-}C_{20})$hydrocarbyl substituents as described herein. In one embodiment, Group 13 metal compounds are tri$((C_1\text{-}C_{20})$hydrocarbyl)-substituted-aluminum or tri$((C_1\text{-}C_{20})$hydrocarbyl)-boron compounds. In other embodiments, Group 13 metal compounds are tri(hydrocarbyl)-substituted-aluminum, tri$((C_1\text{-}C_{20})$hydrocarbyl)-boron compounds, tri$((C_1\text{-}C_{10})$alkyl)aluminum, tri$((C_6\text{-}C_{18})$aryl) boron compounds, and halogenated (including perhalogenated) derivatives thereof. In further embodiments, Group 13 metal compounds are tris(fluoro-substituted phenyl) boranes, tris(pentafluorophenyl) borane. In some embodiments, the activating co-catalyst is a tris$((C_1\text{-}C_{20})$hydrocarbyl borate (e.g. trityl tetrafluoroborate) or a tri$((C_1\text{-}C_{20})$hydrocarbyl) ammonium tetra$((C_1\text{-}C_{20})$hydrocarbyl) borane (e.g. bis(octadecyl)

Combinations of neutral Lewis acid activators (co-catalysts) include mixtures comprising a combination of a tri$((C_1\text{-}C_4)$alkyl)aluminum and a halogenated tri$((C_6\text{-}C_{18})$aryl) boron compound, especially a tris(pentafluorophenyl) borane. Other embodiments are combinations of such neutral Lewis acid mixtures with a polymeric or oligomeric alumoxane, and combinations of a single neutral Lewis acid, especially tris(pentafluorophenyl) borane with a polymeric or oligomeric alumoxane.

The catalyst system comprising the metal-ligand complex of formula (I) may be activated to form an active catalyst composition by combination with one or more co-catalysts, for example, a cation forming co-catalyst, a strong Lewis acid, or combinations thereof. Suitable activating co-catalysts include polymeric or oligomeric aluminoxanes, especially methyl aluminoxane, as well as inert, compatible, noncoordinating, ion forming compounds. Exemplary suitable co-catalysts include, but are not limited to: modified methyl aluminoxane (MMAO), bis(hydrogenated tallow alkyl)methyl, tetrakis(pentafluorophenyl)borate$(1^-)$ amine, and combinations thereof.

In some embodiments, one or more of the foregoing activating co-catalysts are used in combination with each other. An especially preferred combination is a mixture of a tri$((C_1\text{-}C_4)$hydrocarbyl)aluminum, tri$((C_1\text{-}C_4)$hydrocarbyl) borane, or an ammonium borate with an oligomeric or polymeric alumoxane compound. The ratio of total number of moles of one or more metal-ligand complexes of formula (I) to total number of moles of one or more of the activating co-catalysts is from 1:10,000 to 100:1. In some embodiments, the ratio is at least 1:5000, in some other embodiments, at least 1:1000; and 10:1 or less, and in some other embodiments, 1:1 or less. When an alumoxane alone is used as the activating co-catalyst, preferably the number of moles of the alumoxane that are employed is at least 100 times the number of moles of the metal-ligand complex of formula (I). When tris(pentafluorophenyl) borane alone is used as the activating co-catalyst, in some other embodiments, the number of moles of the tris(pentafluorophenyl) borane that are employed to the total number of moles of one or more metal-ligand complexes of formula (I) from 0.5:1 to 10:1, from 1:1 to 6:1, or from 1:1 to 5:1. The remaining activating co-catalysts are generally employed in approximately mole quantities equal to the total mole quantities of one or more metal-ligand complexes of formula (I).

Cast Stretch Films

Also disclosed is a cast stretch film comprising a polyethylene composition characterized by having the following: (a) a density of from 0.910 to 0.945 g/cm$^3$; (b) a melt index ($I_2$) of from 0.5 to 7 g/10 min; (c) a first polyethylene fraction having a single peak in a temperature range of from 40° C. to 85° C. in an elution profile via improved comonomer composition distribution (iCCD) analysis method; (d) a second polyethylene fraction having at least one peak in a temperature range of from 90° C. to 115° C. in the elution profile via iCCD analysis method, and wherein a second polyethylene area fraction is an area in the elution profile beneath the peak of the second polyethylene fraction between 90° C. and 115° C., and wherein the second polyethylene area fraction comprises at least 30% of the total area of the elution profile; and (e) a MWCDI value of less than 0. The cast stretch films, in embodiments, can be formed from the same or similar polyethylene compositions described above and herein (e.g., the polyethylene composition of the cast stretch films may have the same properties as the polyethylene composition described above, or may not be so limited, such as not necessarily having only a "single peak" in the second polyethylene fraction or not necessarily having a width of the peak of the second polyethylene fraction at 50 percent peak height of less than 4.0° C.).

The cast stretch film according to embodiments disclosed herein can be formed via any conventional process known in the art. In general, a cast stretch film can be formed by a cast film extrusion process where a polyethylene composition is melted through a slot or flat die to form a thin, molten sheet or film. This film can then be pinned to the surface of a chill roll (typically water-cooled and chrome-plated) by a blast of air from an air knife or vacuum box. The film quenches immediately and then can have its edges slit prior to winding. The film can be cold-stretched in the longitudinal and/or transverse direction without the application of heat and which when stretched around a load, can maintain tension for an extended period of time.

In some embodiments, the cast stretch film is a monolayer film. In other embodiments, the cast stretch film is a multilayer film. In some embodiments of multilayer films that include the presently disclosed polyethylene composition, a multilayer film can include a polyethylene composition of the present disclosure in an inner layer and/or also in a surface layer. The amount of the polyethylene composition to use in the cast stretch films of the present embodiments can depend on a number of factors including, for example, whether the film is a monolayer or multilayer film, the other layers in the film if it is a multilayer film, the end use application of the film, and others.

Cast stretch films of the present disclosure can have a variety of thickness. The thickness of the cast stretch film can depend on a number of factors including, for example, whether the film is a monolayer or multilayer film, the other layers in the film if it is a multilayer film, the desired properties of the film, the end use application of the film, the equipment available to manufacture the film, and others. In some embodiments, a cast stretch film of the present disclosure has a thickness of up to 10 mils. For example, the cast stretch film can have a thickness from a lower limit of 0.2 mils, 0.5 mils, 0.7 mils, 1.0 mil, 1.75 mils, or 2.0 mils to an upper limit of 4.0 mils, 6.0 mils, 8.0 mils, or 10 mils.

In embodiments where the cast stretch film is a multilayer film, the number of layers in the film can depend on a number of factors including, for example, the desired properties of the film, the desired thickness of the film, the content of the other layers of the film, the end use application of the film, the equipment available to manufacture the film, and others. A cast stretch film can comprise up to 2, 3, 4, 5, 6, 7, 8, 9, 10, or 11 layers in various embodiments.

In embodiments where the cast stretch film is a multilayer film, the cast stretch films can include other layer such as skin layers, cling layers, and/or release layers. For example, a cast stretch film according to embodiments disclosed herein can further comprise other layers typically included in cast stretch film structures depending on the application including, for example, other skin layers, cling layers, release layers, barrier layers, sealant layers, tie layers, polyethylene layers, and/or polypropylene layers. In additional embodiments, a printed layer may be included that may be an ink layer to show product details and other packaging information in various colors.

The presently disclosed polyethylene compositions, according to some embodiments, can be incorporated into cast stretch films and articles that are comprised primarily, if not substantially or entirely, of polyethylene in order to provide a film and articles that are more easily recyclable. For example, a cast stretch film wherein the film comprises primarily polyethylene has an improved recyclability profile in addition to other advantages that the usage of such polymers may provide. In some embodiments, the cast stretch film comprises 95 wt. % or more polyethylene based on the total weight of the film. In other embodiments, the film comprises 96 wt. % or more, 97 wt. % or more, 98 wt. % or more, or 99 wt. % or more polyethylene based on the total weight of the film. In further embodiments, the cast stretch film is void of polypropylene.

Exemplary properties of cast stretch films comprising polyethylene compositions produced according to embodiments disclosed and described herein will now be provided. The molecular make-up of the polyethylene compositions can affect the properties of the cast stretch film. The properties of the cast film disclosed herein may be combined in any fashion within the scope of this disclosure. The following film properties were measured on a cast stretch film produced as disclosed above—without mixing the polyethylene composition with another polymer—and having a thickness of approximately 0.6 mil.

In embodiments, the cast stretch film has an average ultimate stretch in the range of from 200% to 500% at 0.6 mil and 20 inch film width. All individual values and subranges of from 200% to 500% are disclosed and included herein. For examples, the cast stretch film can have an average ultimate stretch from 200% to 500%, from 200% to 475%, from 200% to 450%, from 250% to 500%, from 250% to 475%, from 250% to 450%, from 300% to 500%, from 300% to 475%, from 300% to 450%, from 325% to 500%, from 325% to 475%, or from 325% to 450%, where average ultimate stretch can be measured in accordance with the test method described below.

In embodiments, the cast stretch film has an average time-to-break at 0.6 mil thickness and 20 inch film width of at least 5 seconds. All individual values and subranges of at least 5 seconds(s) are disclosed and included herein. For example, the cast stretch film can have an average time-to-break (ESTL Tear) measured at 0.6 mil thickness and 20 inch film width of at least 5 s, at least 6 s, at least 7 s, at least 8 s, at least 9 s, or at least 10 s, or can have an average time-to-break (ESTL Tear) measured at 0.6 mil thickness and 20 inch film width in the range of from 5 s to 30 s, from 7 s to 30 s, from 8 s to 30 s, from 9 s to 30 s, from 5 s to 25 s, from 6 s to 25 s, from 7 s to 25 s, from 8 s to 25 s, from 9 s to 25 s, or from 10 s to 25 s. Time-to-break (ESTL Tear) can be measured in accordance with the test method described below.

In embodiments, the cast stretch film has an average on pallet tear (OPT) measured at 0.6 mil thickness and 20 inch film width of from 10.0 to 20.0 lbs. All individual values and subranges of from 10.0 lbs. to 20 lbs. are disclosed and included herein. For example, the cast stretch film can have an average on pallet tear (OPT) measured at 0.6 mil thickness and 20 inch film width of from 10.0 lbs. to 18 lbs., from 10.0 lbs. to 16 lbs., from 10 lbs. to 14 lbs., from 11 lbs. to 20 lbs., from 11 lbs. to 18 lbs., from 11 lbs. to 16 lbs., from 11 lbs. to 14 lbs., from 12 lbs. to 20 lbs., from 12 lbs. to 18 lbs., or from 12 lbs. to 16 lbs. On pallet tear (OPT) can be measured in accordance with the test method described herein below.

Cast stretch films of embodiments have average on pallet puncture (OPP) using Type A Load Testing measured at 0.6 mil thickness and 20 inch film width from 10.0 lbs. to 15.0 lbs., such as from 10.5 lbs. to 15.0 lbs., from 11.0 lbs. to 14.0 lbs., from 10.5 lbs. to 13.0 lbs., from 11.0 lbs. to 15.0 lbs., from 11.0 lbs. to 14.0 lbs., or from 11.0 lbs. to 13.0 lbs. On pallet puncture using Type A Load Testing can be measured in accordance with the test method described below.

Test Methods

Density

Density is measured in accordance with ASTM D792, and expressed in grams/cm$^3$ (g/cm$^3$).

Melt Index ($I_2$)

Melt index ($I_2$) is measured in accordance with ASTM D-1238 at 190° C. at 2.16 kg. The values are reported in g/10 min, which corresponds to grams eluted per 10 minutes.

Conventional Gel Permeation Chromatography (GPC)

The chromatographic system consisted of a PolymerChar GPC-IR (Valencia, Spain) high temperature GPC chromatograph equipped with an internal IR5 infra-red detector (IR5). The autosampler oven compartment was set at 160° C. and the column compartment was set at 150° C. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80° C. with gentle agitation for 30 minutes. The polystyrene standard peak molecular weights were converted to ethylene-based polymer molecular weights using Equation 5 (as described in Williams and Ward, J. Polym. Sci., Polym. Let., 6, 621 (1968)):

$$M_{polyethylene} = A \times (M_{polystyrene})^B \quad \text{(Equation 1)}$$

where M is the molecular weight, A has a value of 0.4315 and B is equal to 1.0.

A fifth order polynomial was used to fit the respective ethylene-based polymer-equivalent calibration points. A small adjustment to A (from approximately 0.375 to 0.440) was made to correct for column resolution and band-broadening effects using a homopolymer polyethylene standard with a molecular weight of 120,000 g/mol.

The total plate count of the GPC column set was performed with decane (prepared at 0.04 g in 50 milliliters of TCB and dissolved for 20 minutes with gentle agitation). The plate count (Equation 2) and symmetry (Equation 3) were measured on a 200 microliter injection according to the following equations:

$$\text{Plate Count} = 5.54 \times \left(\frac{RV_{Peak\ Max}}{\text{Peak Width at half height}}\right)^2 \quad \text{(Equation 2)}$$

where RV is the retention volume in milliliters, the peak width is in milliliters, the peak max is the maximum height of the peak, and half height is one half of the height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad \text{(Equation 3)}$$

where RV is the retention volume in milliliters and the peak width is in milliliters, Peak max is the maximum position of the peak, one tenth height is one tenth of the height of the peak maximum, and where rear peak refers to the peak tail at later retention volumes than the peak max and where front peak refers to the peak front at earlier retention volumes than the peak max. The plate count for the chromatographic system should be greater than 22,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 3 hours at 160° C. under "low speed" shaking.

The calculations of $M_{n(GPC)}$, $M_{w(GPC)}$, and $M_{z(GPC)}$ were based on GPC results using the internal IR5 detector (measurement channel) of the PolymerChar GPC-IR chromatograph according to Equations 3-6, using PolymerChar GPCOne™ software, the baseline-subtracted IR chromatogram at each equally-spaced data collection point i ($IR_i$) and the ethylene-based polymer equivalent molecular weight obtained from the narrow standard calibration curve for the point i ($M_{polyethylene,i}$ in g/mol) from Equation 1.

Number-average molecular weight $M_{n(GPC)}$, weight-average molecular weight $M_{w(GPC)}$ and z-average molecular weight $M_{z(GPC)}$ can be calculated as the following equations.

$$Mn_{(GPC)} = \frac{\sum^{i} IR_i}{\sum^{i} \left( IR_i / M_{polyethylene,i} \right)} \quad \text{(Equation 4)}$$

$$Mw_{(GPC)} = \frac{\sum^{i} \left( IR_i * M_{polyethylene,i} \right)}{\sum^{i} IR_i} \quad \text{(Equation 5)}$$

$$Mz_{(GPC)} = \frac{\sum^{i} \left( IR_i * M_{polyethylene,i} \right)}{\sum^{i} \left( IR_i * M_{polyethylene,i} \right)} \quad \text{(Equation 6)}$$

In order to monitor the deviations over time, a flow rate marker (decane) was introduced into each sample via a micropump controlled with the PolymerChar GPC-IR system. This flow rate marker (FM) was used to linearly correct the pump flow rate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flow rate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flow rate (with respect to the narrow standards calibration) is calculated as Equation 7. Processing of the flow marker peak was done via the PolymerChar GPCOne™ Software. Acceptable flow rate correction is such that the effective flowrate should be within 0.5% of the nominal flowrate.

$$\text{Flow rate}_{effective} = \text{Flow rate}_{nominal} \times (RV(\text{FM}_{calibrated}) / RV(\text{FM}_{Sample})) \quad \text{(Equation 7)}$$

Improved Comonomer Composition Distribution (iCCD) Analysis Method

Improved method for comonomer content analysis (iCCD) was developed in 2015 (Cong and Parrott et al., WO2017040127A1). iCCD test was performed with Crystallization Elution Fractionation instrumentation (CEF) (PolymerChar, Spain) equipped with IR-5 detector (PolymerChar, Spain) and two angle light scattering detector Model 2040 (Precision Detectors, currently Agilent Technologies). A guard column packed with 20-27 micron glass (MoSCi Corporation, USA) in a 5 cm or 10 cm (length)×¼" (ID) stainless was installed just before IR-5 detector in the detector oven. Ortho-dichlorobenzene (ODCB, 99% anhydrous grade or technical grade) was used. Silica gel 40 (particle size 0.2-0.5 mm, catalogue number 10181-3) from EMD Chemicals was obtained (can be used to dry ODCB solvent before). Dried silica was packed into three emptied HT-GPC columns to further purify ODCB as eluent. The CEF instrument is equipped with an autosampler with N2 purging capability. ODCB is sparged with dried nitrogen (N2) for one hour before use. Sample preparation was done with autosampler at 4 mg/ml (unless otherwise specified) under shaking at 160° C. for 1 hour. The injection volume was 300 μl. The temperature profile of iCCD was: crystallization at 3° C./min from 105° C. to 30° C., the thermal equilibrium at 30° C. for 2 minute (including Soluble Fraction Elution Time being set as 2 minutes), elution at 3° C./min from 30° C. to 140° C. The flow rate during crystallization is 0.0 ml/min. The flow rate during elution is 0.50 ml/min. The data was collected at one data point/second.

The iCCD column was packed with gold coated nickel particles (Bright 7GNM8-NiS, Nippon Chemical Industrial Co.) in a 15 cm. (length)×¼" (ID) stainless tubing. The column packing and conditioning were with a slurry method according to the reference (Cong, R.; Parrott, A.; Hollis, C.; Cheatham, M. WO2017040127A1). The final pressure with TCB slurry packing was 150 Bars.

Column temperature calibration was performed by using a mixture of the Reference Material Linear homopolymer polyethylene (having zero comonomer content, Melt index ($I_2$) of 1.0, polydispersity $M_w/M_n$ approximately 2.6 by conventional gel permeation chromatography, 1.0 mg/ml) and Eicosane (2 mg/ml) in ODCB. iCCD temperature calibration consisted of four steps: (1) Calculating the delay volume defined as the temperature offset between the measured peak elution temperature of Eicosane minus 30.00° C.; (2) Subtracting the temperature offset of the elution temperature from iCCD raw temperature data. It is noted that this temperature offset is a function of experimental conditions, such as elution temperature, elution flow rate, etc.; (3) Creating a linear calibration line transforming the elution temperature across a range of 30.00° C. and 140.00° C. so that the linear homopolymer polyethylene reference had a peak temperature at 101.0° C., and Eicosane had a peak temperature of 30.0° C.; (4) For the soluble fraction measured isothermally at 30° C., the elution temperature below 30.0° C. is extrapolated linearly by using the elution heating rate of 3° C./min according to the reference (Cerk and Cong et al., U.S. Pat. No. 9,688,795).

Figure 6:
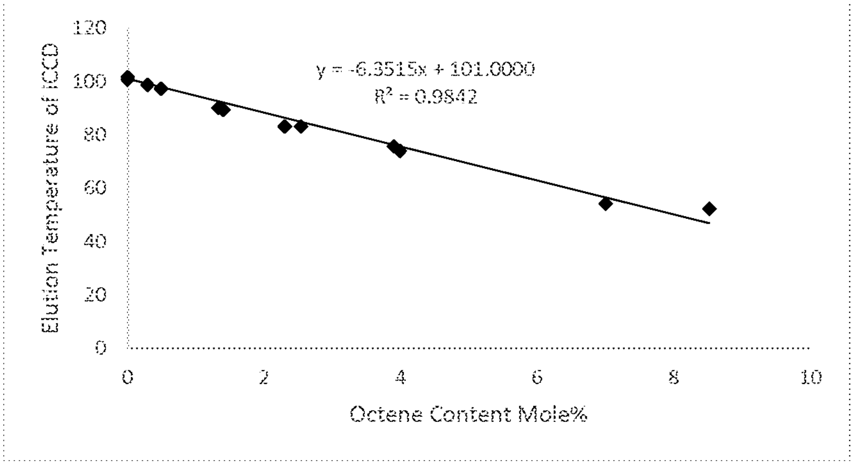
FIG. 6 is a graph of octene mole % versus elution temperature for iCCD.

The comonomer content versus elution temperature of iCCD was constructed by using 12 reference materials (ethylene homopolymer and ethylene-octene random copolymer made with single site metallocene catalyst, having ethylene equivalent weight average molecular weight ranging from 35,000 to 128,000). All of these reference materials were analyzed the same way as specified previously at 4 mg/mL. The reported elution peak temperatures followed the graph in FIG. 6 of octene mole % versus elution temperature of iCCD at $R^2$ of 0.9842.

Molecular weight of polymer and the molecular weight of the polymer fractions was determined directly from LS detector (90 degree angle) and concentration detector (IR-5) according Rayleigh-Gans-Debys approximation (Striegel and Yau, Modern Size Exclusion Liquid Chromatogram, Page 242 and Page 263) by assuming the form factor of 1 and all the virial coefficients equal to zero. Integration windows are set to integrate all the chromatograms in the elution temperature (temperature calibration is specified above) range from 23.0 to 120° C.

The calculation of Molecular Weight (Mw) from iCCD includes the following steps:

1) Measuring the interdetector offset. The offset is defined as the geometric volume offset between LS with respect to concentration detector. It is calculated as the difference in the elution volume (mL) of polymer peak between concentration detector and LS chromatograms. It is converted to the temperature offset by using elution thermal rate and elution flow rate. A linear high density polyethylene (having zero comonomer content, Melt index ($I_2$) of 1.0, polydispersity $M_w/M_n$ approximately 2.6 by conventional gel permeation chromatography) is used. Same experimental conditions as the normal iCCD method above are used except the following parameters: crystallization at 10° C./min from 140° C. to 137° C., the thermal equilibrium at 137° C. for 1 minute as Soluble Fraction Elution Time, soluble fraction (SF) time of 7 minutes, elution at 3° C./min from 137° C. to 142° C. The flow rate during crystallization is 0.0 ml/min. The flow rate during elution is 0.80 ml/min. Sample concentration is 1.0 mg/ml.

2) Each LS datapoint in LS chromatogram is shifted to correct for the interdetector offset before integration.
3) Baseline subtracted LS and concentration chromatograms are integrated for the whole eluting temperature range of the Step 1). The MW detector constant is calculated by using a known MW HDPE sample in the range of 100,000 to 140,000Mw and the area ratio of the LS and concentration integrated signals.
4) Mw of the polymer was calculated by using the ratio of integrated light scattering detector (90 degree angle) to the concentration detector and using the MW detector constant.

The width of the peak of the second fraction at 50 percent peak height (also known as the full width at half max) is calculated for the second eluted peak between 35.0° C. and 119.0° C. via iCCD. The width of the peak of the second fraction at 50 percent peak height is determined by taking half of the peak temperature elution maximum of the second eluted peak and calculating the temperature difference between the front temperature and the rear temperature of the second elution peak at one-half of the total height.

Molecular Weighted Comonomer Distribution Index (MWCDI)

A GPC-IR, high temperature chromatographic system from PolymerChar (Valencia, Spain) was equipped with a Precision Detectors (Amherst, MA), 2-angle laser light scattering detector Model 2040, an IR5 infra-red detector (GPC-IR) and a 4-capillary viscometer, both from PolymerChar. The "15-degree angle" of the light scattering detector was used for calculation purposes. Data collection was performed using PolymerChAR Instrument Control software and data collection interface. The system was equipped with an on-line, solvent degas device and pumping system from Agilent Technologies (Santa Clara, CA).

Injection temperature was controlled at 150 degrees Celsius. The columns used, were four 20-micron "PLGel Mixed-A" light scattering columns from Agilent Technologies. The solvent was 1,2,4-trichlorobenzene. Samples were prepared as described in the Conventional GPC section of this report. The chromatographic solvent and the sample preparation solvent each contained "200 ppm of butylated hydroxytoluene (BHT)." Both solvent sources were nitrogen sparged. Ethylene-based polymer samples were stirred gently, at 160 degrees Celsius, for three hours. The injection volume was "200 microliters," and the flow rate was "1 milliliters/minute."

Calibration of the GPC column set was performed with 21 "narrow molecular weight distribution" polystyrene standards, with molecular weights ranging from 580 to 8,400,000 g/mole. These standards were arranged in six "cocktail" mixtures, with at least a decade of separation between individual molecular weights. The standards were purchased from Polymer Laboratories (Shropshire UK). The polystyrene standards were prepared at "0.025 grams in 50 milliliters of solvent" for molecular weights equal to, or greater than, 1,000,000 g/mole, and at "0.050 grams in 50 milliliters of solvent" for molecular weights less than 1,000,000 g/mole. The polystyrene standards were dissolved at 80 degrees Celsius, with gentle agitation, for 30 minutes. The narrow standards mixtures are run first, and in order of decreasing "highest molecular weight component," to minimize degradation. The polystyrene standard peak molecular weights were converted to polyethylene molecular weights using Equation 8 (as described in Williams and Ward, J. Polym. Sci., Polym. Let., 6, 621 (1968)):

$$Mpolyethylene = A \times (Mpolystyrene)^B, \quad \text{(EQ 8)}$$

where M is the molecular weight, A has a value of approximately 0.4315 and B is equal to 1.0. The A value was adjusted between 0.375 and 0.444 (depending upon specific column-set efficiency), such that a linear polyethylene weight-average molecular weight corresponded to 120,000 g/mole, as calculated by Equation 10, below:

$$Mn(gpc\ LALS) = \frac{\sum_{i=RV\ integeration\ start}^{i=RV\ integration\ end}\left(IR_{measurment\ channel_i}\right)}{\sum_{i=RV\ integeration\ start}^{i=RV\ integration\ end}\left(IR_{measurment\ channel_i} / LogM_{PE_i}\right)}, \quad \text{(EQ 9)}$$

$$Mw(gpc\ LALS) = \frac{\sum_{i=RV\ integeration\ start}^{i=RV\ integration\ end}\left(LogM_{PE_i} IR_{measurement\ channel_i}\right)}{\sum_{i=RV\ integeration\ start}^{i=RV\ integration\ end}\left(IR_{measurment\ channel_i}\right)}. \quad \text{(EQ 10)}$$

In Equations 9 and 10, RV is column retention volume (linearly-spaced), collected at "1 point per second." The IR is the baseline-subtracted IR detector signal, in Volts, from the measurement channel of the GPC instrument, and the Log MPE is the polyethylene-equivalent MW determined from Equation 8. Data calculation were performed using "GPC One software" from PolymerChar.

A calibration for the IR5 detector rationing was performed using at least ten ethylene-based polymer standards (polyethylene homopolymer and ethylene/octene copolymers) of known short chain branching (SCB) frequency (as measured by 13C NMR Method), ranging from homopolymer (0 SCB/1000 total C) to approximately 50 SCB/1000 total C, where total C=carbons in backbone+carbons in branches. Each standard had a weight-average molecular weight from 36,000 g/mole to 126,000 g/mole, as determined by the GPC.LALS processing method described above. Each standard had a molecular weight distribution (Mw/Mn) from 2.0 to 2.5, as determined by the GPC-LALS processing method described above.

The "IR5 Area Ratio (or "$IR5_{Methyl\ Channel\ Area}/IR5_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of the following Equation 11:

SCB/1000 total $C=A_0+[A_1\times(IR5_{Methyl\ Channel\ Area}/IR5_{Measurement\ Channel\ Area})]$ (EQ 11), where $A_0$ is the "SCB/1000 total C" intercept at an "IR5 Area Ratio" of zero, and $A_1$ is the slope of the "SCB/1000 total C" versus "IR5 Area Ratio" and represents the increase in the SCB/1000 total C as a function of "IR5 Area Ratio."

A series of "linear baseline-subtracted chromatographic heights" for the chromatogram generated by the "IR5 methyl channel sensor" was established as a function of column elution volume, to generate a baseline-corrected chromatogram (methyl channel). A series of "linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer, as follows in Equation 12:

Mole Percent Comonomer=$\{SCB_f/[SCB_f+((1000-SCB_f*\text{Length of comonomer})/2)]\}*100$ (EQ 12), where "$SCB_f$" is the "SCB per 1000 total C", and the "Length of comonomer"=8 for octene, 6 for hexene, and so forth.

Each elution volume index was converted to a molecular weight value ($Mw_i$) using the method of Williams and Ward (described above; EQ 8). The "Mole Percent Comonomer (y axis)" was plotted as a function of Log (Mw;), and the slope was calculated between $Mw_i$ of 50,000 and $Mw_i$ of 750,000 g/mole (end group corrections on chain ends were omitted for this calculation). An EXCEL linear regression was used to calculate the slope between, and including, $Mw_i$ from 50,000 to 750,000 g/mole. This slope is defined as the molecular weighted comonomer distribution index (MWCDI=Molecular Weighted Comonomer Distribution Index).

A representative determination of MWCDI of a composition is provided in U.S. Pat. No. 10,138,362B2, which is incorporated herein by reference in its entirety.

Zero Shear Viscosity Ratio (ZSVR)

ZSVR is defined as the ratio of the zero-shear viscosity (ZSV) of the branched polyethylene material to the ZSV of the linear polyethylene material at the equivalent weight average molecular weight (Mw-gpc) according to the following Equations 13 and 14:

$$ZSVR = \frac{\eta_{0B}}{\eta_{0L}} \quad \text{(EQ 13)}$$

$$\eta_{0L} = 2.29\times10^{-15} M_{w-gpc}^{3.65} \quad \text{(EQ 14)}$$

The ZSV value is obtained from creep test at 190° C. via the method described above. The Mw-gpc value is determined by the conventional GPC method (Equation 5 in the Conventional GPC method description). The correlation between ZSV of linear polyethylene and its Mw-gpc was established based on a series of linear polyethylene reference materials. A description for the ZSV-Mw relationship can be found in the ANTEC proceeding: Karjala, Teresa P., Sammler, Robert L., Mangnus, Marc A., Hazlitt, Lonnie G., Johnson, Mark S., Hagen, Charles M. Jr., Huang, Joe W. L., Reichek, Kenneth N., "Detection of low levels of long-chain branching in polyolefins", Annual Technical Conference-Society of Plastics Engineers (2008), 66th 887-891.

Stretch Film Testing

Stretch technology is characterized by the use of application-specific testing in order to predict performance in the field. The key component of application testing relates to testing the film in a stretched state, which would simulate performance during stretch wrapping. For all of the film tests, samples of 0.6 mil thickness and 20 inch film width are tested. Two types of stretch tests are performed in the stretch lab on the films produced. One involves the use of an ESTL film performance tester that has been developed to offer stretch film testing in representative conditions. The ESTL film performance tester is used to measure ultimate stretch which indicates the maximum level of stretch that could be applied during pallet wrapping. It is also used to perform a tear propagation test to analyze tear performance of the film during stretched conditions.

A second set of tests utilizes a Lantech stretch wrapper which has been outfitted in-house with a 44 in×35 in×60 in metal frame to simulate pallet wrapping. Tests performed with this set-up capture the mechanical or abuse properties of the film as well as the films ability to unitize the load, and the cling value of the film.

Ultimate Stretch (US)

Ultimate stretch is measured using an ESTL film performance tester (ESTL, Deerlijk, Belgium)—FPT-750 Film Property Tester. The ultimate stretch test is selected from the test menu and the W-wrap method is then selected. Table A provides the settings for the equipment used in this method. The unwind force, wind force, peel off force, stretch force, peel angle and sound level are measured as a function of the pre-stretch. The pre-stretch is increased until a breaking point. The wind speed during the test is constant at 360 feet/min. The test is repeated 3 times and an average ultimate stretch (US) is reported as a percentage (%) ultimate stretch.

TABLE A

| | | |
|---|---|---|
| Strain Start | % | 200.0 |
| Strain Interval | % | 10.0 |
| Line velocity | ft/min | 360 |
| Unwind strain | % | 6.7 |
| Wind strain | % | 4 |

On Pallet Puncture-Type A Load (OPP-A)

This test uses a Bruceton staircase method to determine the maximum force to load at which the film can be passed over a test probe for three wraps with no failures. The test probe is inserted into the test stand at the desired protrusion distance. Type A Load is tested with a 3 inch probe; Type B Load is tested with a 6 inch probe; and Type C Load is tested with a 12 inch probe. The film is positioned such that the test probe is aligned with the center of the film. The film is attached to the test stand and the wrapper started. Once the wrapper reaches 250% pre-stretch, the film is allowed to pass over the probe for a maximum of three wraps. The film is wrapped three times starting with a low F2 force of 7 lbs. If the film is not punctured by the probe, the test is repeated at an increased F2 force at increments of 0.5 lbs. until failure. At each 0.5 lb. increment the film is manually pushed over the probe and a fresh set of film is tested. Any breakage of the film during any of the wrap is considered a failure at that force to load setting. Depending on the performance of the film at the load setting (i.e., passed or failed), the force to load is adjusted up or down, and the test is repeated at the new load setting. This test continues until the maximum force at which failure is greater than 50% is found. The failing F2 force represents the film's on-pallet puncture value and generally a standard deviation is not reported unless the test is repeated more than 2 times starting from 7 lbs. The highest passing F2 force is reported with data significance considered to be +/−1 lb. It should be understood that Type A Load Test is commonly used in pallet packing that a person of ordinary skill in the art would recognize its meaning as used herein. Table B provides the equipment and settings used in this method.

TABLE B

| | |
|---|---|
| Equipment | Lantech SHC Film Test Wrapper |
| Pre-stretch | 250% |
| Turntable Speed | 10 rpm |
| Force to Load (F2) | Variable |
| Probe Type | 4" by 4" blunt rod |
| Probe Protrusion Distance | 12 in |

On Pallet Puncture-Type B Load (OPP-B)

If unitized pallet is not uniform in shape with limited irregularities, it's defined as Type "B-Load". This test uses a Bruceton staircase method to determine the maximum force to load at which the film can be passed over a test probe for three overlapping wraps with no failures. The test probe is inserted into the test stand at the desired protrusion distance. All films were tested by 2 inch×2 inch blunt metal probe extending 6 inches out. The film is positioned such that the test probe is aligned with the center of the film. The film is attached to the test stand and the wrapper started. Once the wrapper reaches 250% pre-stretch, the film is allowed to pass over the probe for a maximum of three wraps. The film is wrapped three times starting with post stretch film tension/force to load (F2) of 7 lbs. If the film is not punctured by the probe, the test is repeated at an increased F2 force at increments of 0.5 lbs. until failure. Any breakage of the film during any of the wrap is considered a failure at that force to load setting. Once the F2 force reaches a point where failures start to happen the test is repeated for 6 times at one force setting. If the film passes 4 of the 6 tests the film F2 force is increased. If the film fails 4 of the 6 tests then the test is stopped and this is considered the failure point of the film. Depending on the performance of the film at the load setting (i.e., passed or failed), the force to load is increased/decreased and the test is repeated at the new load setting. This test continues until the maximum force at which failure is greater than 50% is found. The highest passing F2 force is reported as On Pallet Puncture (OPP) value. Standard variation for this test is observed to be +/−1 lb. It should be understood that Type B Load Test is commonly used in pallet packing that a person of ordinary skill in the art would recognize its meaning as used herein. Table C below provides the equipment and settings used in this method.

TABLE C

| | |
|---|---|
| Equipment | Lantech SHC Film Test Wrapper |
| Pre-stretch | 250% |
| Turntable Speed | 10 rpm |
| Force to Load (F2) | Variable |
| Probe Type | 2" by 2" blunt rod |
| Probe Protrusion Distance | 6 in |

On Pallet Tear (OPT)

This test uses a Bruceton staircase method to determine the maximum force to load at which the film can be passed over a test probe fixed with a blade to initiate a puncture. The test probe is inserted into the test stand at the desired protrusion distance. The film is positioned such that the test probe is aligned with the center of the film. The film is attached to the test stand and the wrapper started. Once the wrapper reaches 250% pre-stretch, the film is allowed to pass over the probe, for this test a single layer of film is tested. The film tension (F2 force) is increased from an initial low value of ~7 lbs. in increments of 0.5 lbs. until the film tears completely across the cross direction (CD) or transverse direction (TD). An on-pallet tear value is recorded as the highest F2 force that results in the initial puncture not propagating through the entire width of the film causing its failure. Table D provides the equipment and settings used in this method.

TABLE D

| | |
|---|---|
| Equipment | Lantech SHC Film Test Wrapper |
| Pre-stretch | 250% |
| Turntable Speed | 17 rpm |
| Force to Load (F2) | Variable |
| Probe Type | 4" by 4" blunt rod fixed with a razor blade |
| Probe Protrusion Distance | 5 in |

Tear Propagation/Time-to-Break (ESTL Tear)

Tear propagation/time-to-break is measured using an ESTL film performance tester (ESTL, Deerlijk, Belgium)—FPT-750 Film Property Tester. 'Tear Propagation' is selected from the test menu and the W-wrap method is then selected. Table E provides the parameters that are selected on the equipment to measure time-to-break (ESTL tear). The sample cast stretch film is brought to a condition of pre-stretch and tension, followed by clamping of the film. A small 'spear shaped knife' is used to make a small vertical cut into the film. Once this cut has been made, the canvas unclamps the film. After one second the wind spindle starts to pull on the film with a constant speed. The other shafts are blocked. This generates a pulling force in the film after the initial cut. The FPT-750 Film Property Tester monitors how long it takes and how much force it takes to break open the full film height. The test is repeated 3 times and an average time-to-break is reported in seconds(s).

TABLE E

| | | |
|---|---|---|
| Strain Start | % | 250.0 |
| Line velocity | ft/min | 195 |
| Puncture Probe | | Propagation |
| Unwind tension | lbf | 6.70 |
| Wind strain | % | 10.0 |
| Stretch on loads | % | 285.0 |

EXAMPLES

Preparation of Inventive Polyethylene Compositions (Poly. 1 and Poly. 2)

Inventive Polyethylene Compositions ("Poly. 1" and "Poly. 2") are prepared according to the following process and tables.

All raw materials (monomer and comonomer) and the process solvent (a narrow boiling range high-purity isoparaffinic solvent, Isopar-E) are purified with molecular sieves before introduction into the reaction environment. High purity hydrogen is supplied by shared pipeline and dried with molecular sieve. The reactor monomer feed stream is pressurized via a mechanical compressor to above reaction pressure. The solvent feed is pressurized via a pump to above reaction pressure. The comonomer feed is pressurized via a pump to above reaction pressure. The individual catalyst components are manually batch diluted with purified solvent and pressured to above reaction pressure. All reaction feed flows are measured with mass flow meters and independently controlled with computer automated metering pumps.

Reactor configuration is either dual parallel reactor operation or dual series reactor operation as specified in Table G.

Either a single reactor system, a two reactor system in parallel configuration, or a two reactor system in a series configuration is used. Each reactor is a continuous solution polymerization reactor consisting of a liquid full, adiabatic, and continuously stirred tank reactor (CSTR). Independent control of all fresh solvent, monomer, comonomer (if present), hydrogen, and catalyst component feeds is possible. The total fresh feed stream to each reactor (solvent, monomer, comonomer [if present], and hydrogen) is temperature controlled, typically between 15-50° C. to maintain a single solution phase, by passing the feed stream through a heat exchanger. The total fresh feed to each polymerization reactor is injected into the reactor at one location. The fresh feed is controlled with each injector receiving half of the total fresh feed mass flow. The catalyst components are injected into the polymerization reactor separate from the other feeds. The primary catalyst component feed is computer controlled to maintain the reactor monomer conversion at the specified values. The cocatalyst component(s) is/are fed based on calculated specified molar ratios to the primary catalyst component. An agitator in the reactor is responsible for continuously mixing of the reactants. An oil bath provides for some fine tuning of the reactor temperature control.

In dual parallel reactor configuration the effluent streams from the first and the second polymerization reactors are combined prior to any additional processing.

In dual series reactor configuration the effluent from the first polymerization reactor (containing solvent, monomer, comonomer [if present], hydrogen, catalyst components, and polymer) exits the first reactor loop and is added to the second reactor separate from the other feeds to the second reactor.

In all reactor configurations the final reactor effluent (second reactor effluent for dual series, the combined effluent for dual parallel, or the single reactor effluent) enters a zone where it is deactivated with the addition of and reaction with a suitable reagent (typically water). At this same reactor exit location other additives are added for polymer stabilization (typical antioxidants suitable for stabilization during extrusion and fabrication like Octadecyl 3,5-Di-Tert-Butyl-4-Hydroxyhydrocinnamate, Tetrakis(Methylene (3,5-Di-Tert-Butyl-4-Hydroxyhydrocinnamate)) Methane, and Tris (2,4-Di-Tert-Butyl-Phenyl) Phosphite and acid scavenging agents like calcium stearate if needed).

Following catalyst deactivation and additive addition, the reactor effluent enters a devolatization system where the polymer is removed from the non-polymer stream. The isolated polymer melt is pelletized and collected. The non-polymer stream is removed from the system.

Figure 2:
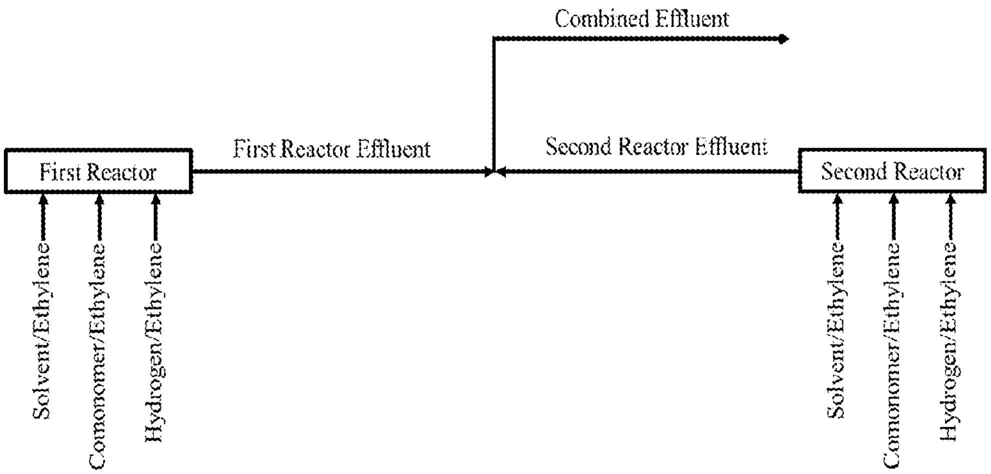
FIG. 2 is an illustration of a dual parallel reactor data flow diagram.
Figure 3:
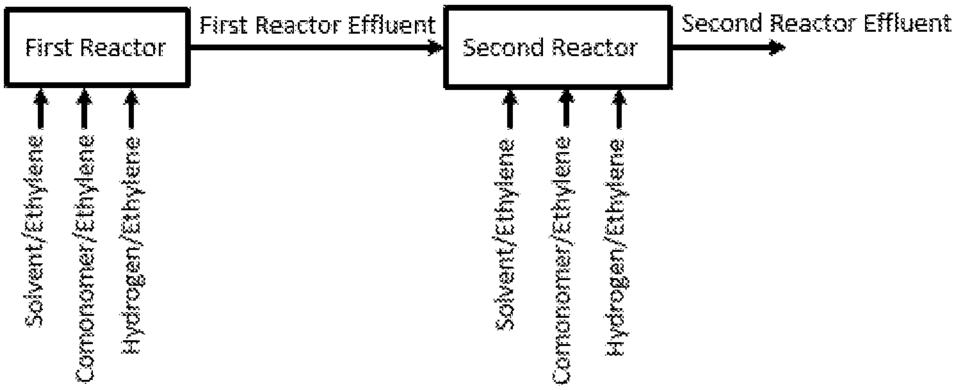
FIG. 3 is an illustration of a dual series reactor data flow diagram.

The reactor stream feed data flows that correspond to the values and information in Tables F and G used to produce the polyethylene compositions (Poly. 1 and Poly. 2) are graphically described in FIG. 2 and FIG. 3.

TABLE F

| Catalyst for Poly. 1 and Poly. 2 | |
|---|---|
| Primary Catalyst component 1 | 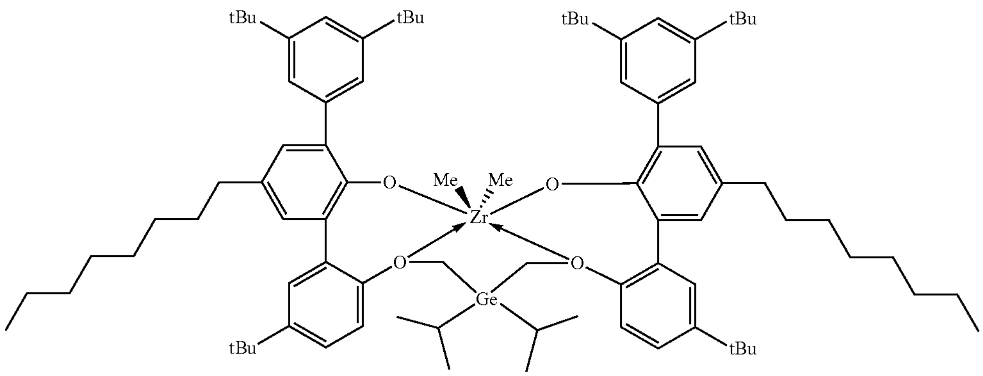 |

TABLE F-continued

| Catalyst for Poly. 1 and Poly. 2 | |
|---|---|
| Primary Catalyst component 2 | 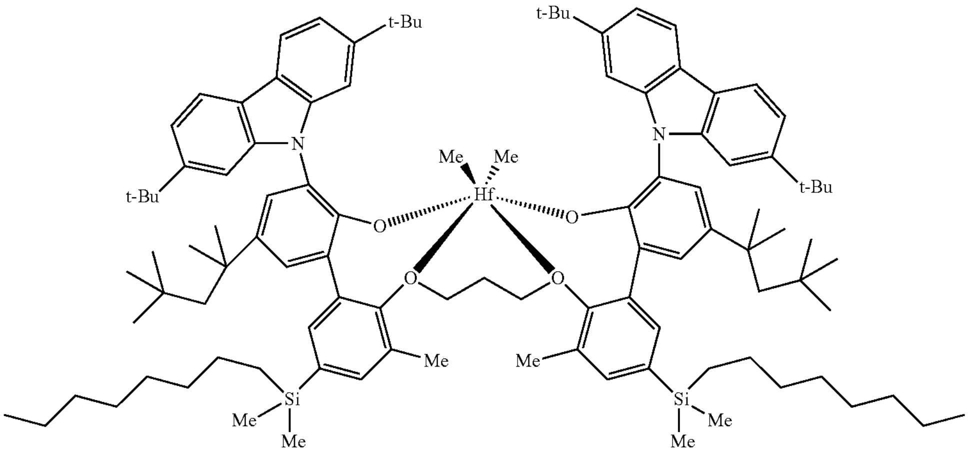 |
| Co-catalyst A | bis(hydrogenated tallow alkyl)methylammonium tetrakis (pentafluorophenyl)borate(1-) amine |
| Co-catalyst B | Aluminoxanes, iso-Bu Me, branched, cyclic and linear; modified methyl aluminoxane |

TABLE G

| Example | | Poly. 1 | Poly. 2 |
|---|---|---|---|
| Reactor Configuration | Type | Dual Series | Dual Parallel |
| Comonomer type | Type | 1-octene | 1-octene |
| First Reactor Feed Solvent/Ethylene Mass Flow Ratio | g/g | 3.5 | 5.2 |
| First Reactor Feed Comonomer/ Ethylene Mass Flow Ratio | g/g | 0.66 | 0.43 |
| First Reactor Feed Hydrogen/ Ethylene Mass Flow Ratio | g/g | 4.1E−04 | 1.6E−04 |
| First Reactor Temperature | ° C. | 165 | 160 |
| First Reactor Pressure | barg | 28 | 28 |
| First Reactor Ethylene Conversion | | 92.0 | 93.3 |
| First Reactor Catalyst Type | Type | Primary Catalyst component 1 | Primary Catalyst component 1 |
| First Reactor Co-Catalyst 1 Type | Type | Co-catalyst A | Co-catalyst A |
| First Reactor Co-Catalyst 2 Type | Type | Co-catalyst B | Co-catalyst B |
| First Reactor Co-Catalyst 1 to Catalyst Molar Ratio | mol/ mol | 1.0 | 1.2 |
| First Reactor Co-Catalyst 2 to Catalyst Molar Ratio | mol/ mol | 14.9 | 79.5 |
| First Reactor Residence Time | min | 11.6 | 9.2 |
| Percentage of Total Ethylene Feed to First Reactor | wt % | 53.9% | 49.9% |
| Second Reactor Feed Solvent/ Ethylene Mass Flow Ratio | g/g | 9.0 | 4.2 |
| Second Reactor Feed Comonomer/ Ethylene Mass Flow Ratio | g/g | 0.000 | 0.071 |
| Second Reactor Feed Hydrogen/ Ethylene Mass Flow Ratio | g/g | 3.1E−04 | 2.6E−04 |
| Second Reactor Temperature | % | 190 | 195 |
| Second Reactor Pressure | barg | 28 | 28 |
| Second Reactor Ethylene Conversion | % | 83.7 | 93.0 |
| Second Reactor Catalyst Type | Type | Primary Catalyst component 2 | Primary Catalyst component 2 |
| Second Reactor Co-Catalyst 1 Type | Type | Co-catalyst A | Co-catalyst A |
| Second Reactor Co-Catalyst 2 Type | Type | Co-catalyst B | Co-catalyst B |
| Second Reactor Co-Catalyst 1 to Catalyst Molar Ratio | mol/ mol | 1.4 | 8.6 |
| Second Reactor Co-Catalyst 2 to Catalyst Molar Ratio | mol/ mol | 380.2 | 268.0 |
| Second Reactor Residence Time | min | 3.3 | 5.4 |

Commercially Available Polyethylene Compositions

Poly. 3 is INNATE™ XUS.59910.08, a linear low density polyethylene composition commercially available from The Dow Chemical Company, Midland, MI.

Poly. 4 is DOWLEX™ 2045, a linear low density polyethylene composition commercially available from The Dow Chemical Company, Midland, MI.

Poly. 5 is INNATE™ ST50, a polyethylene composition commercially available from The Dow Chemical Company, Midland, MI.

Preparation of Developmental Polyethylene Compositions (Poly. 6, Poly. 7, Poly. 8 and Poly. 9)

Developmental polyethylene compositions ("Poly. 6," "Poly. 7," "Poly. 8," and "Poly. 9") are prepared according to the following process and tables.

All raw materials (monomer and comonomer) and the process solvent (a narrow boiling range high-purity isoparaffinic solvent, Isopar-E) are purified with molecular sieves before introduction into the reaction environment. High purity hydrogen is supplied by shared pipeline and dried with molecular sieve. The reactor monomer feed stream is pressurized via a mechanical compressor to above reaction pressure. The solvent feed is pressurized via a pump to above reaction pressure. The comonomer feed is pressurized via a pump to above reaction pressure. The individual catalyst components are manually batch diluted with purified solvent and pressured to above reaction pressure. All reaction feed flows are measured with mass flow meters and independently controlled with computer automated metering pumps.

A two reactor system is used in a series configuration. Each continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer (if present), hydrogen, and catalyst component feeds is possible. The total fresh feed stream to each reactor (solvent, monomer, comonomer [if present], and hydrogen) is temperature controlled, typically between 15-50° C. to maintain a single solution phase, by passing the feed stream through a heat exchanger. The total fresh feed to each polymerization reactor is injected into the reactor at two locations with approximately equal reactor volumes between each injection location. The fresh feed is controlled with each injector receiving half of the total fresh feed mass flow. The catalyst components are injected into the polymerization reactors through a specially designed injection stingers. The primary catalyst component feed is computer controlled to maintain the reactor monomer conversion at the specified values. The cocatalyst component(s) is/are fed based on calculated specified molar ratios to the primary catalyst component. Immediately following each reactor feed injection location, the feed streams are mixed with the circulating polymerization reactor contents with static mixing elements. The contents of each reactor are continuously circulated through heat exchangers responsible for removing much of the heat of reaction and with the temperature of the coolant side responsible for maintaining an isothermal reaction environment at the specified temperature. Circulation around each reactor loop is provided by a pump.

The effluent from the first polymerization reactor (containing solvent, monomer, comonomer [if present], hydrogen, catalyst components, and polymer) exits the first reactor loop and is added to the second reactor separate from the other feeds to the second reactor.

The final reactor effluent (second reactor effluent for dual series configuration) enters a zone where it is deactivated with the addition of and reaction with a suitable reagent (water). At this same reactor exit location other additives are added for polymer stabilization (typical antioxidants suitable for stabilization during extrusion and fabrication like Octadecyl 3,5-Di-Tert-Butyl-4-Hydroxyhydrocinnamate, Tetrakis(Methylene (3,5-Di-Tert-Butyl-4-Hydroxyhydrocinnamate)) Methane, and Tris(2,4-Di-Tert-Butyl-Phenyl) Phosphite and acid scavenging agents like calcium stearate if needed).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process.

The reactor stream feed data flows that correspond to the values and information in Table H and Table I are used to produce the polyethylene compositions (Poly. 6, Poly. 7, Poly. 8 and Poly. 9) are graphically described in FIG. 3. The data are presented such that the complexity of the solvent recycle system is accounted for and the reaction system can be treated more simply as a once through flow diagram.

TABLE H

| Catalysts for Poly. 6, Poly. 7, Poly. 8 and Poly. 9 | |
|---|---|
| Primary Catalyst Comp. 1 | 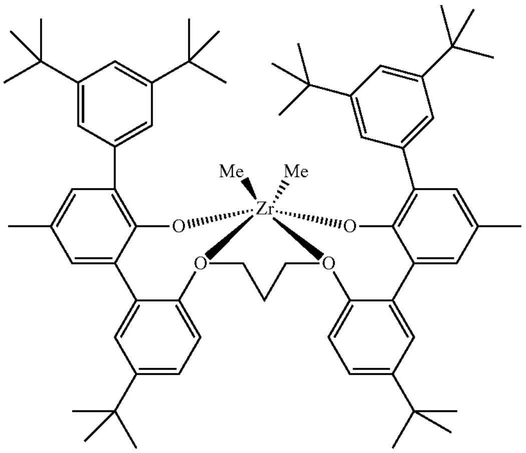 |
| Primary Catalyst Comp. 2 | 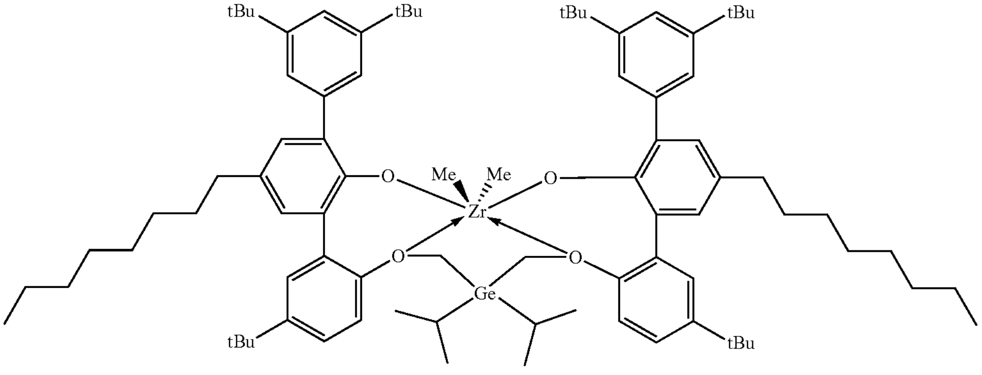 |
| Primary Catalyst Comp. 3 | The catalyst system used in the second reactor comprised a Ziegler-Natta type catalyst. The heterogeneous Ziegler-Natta type catalyst-premix was prepared substantially according to U.S. Pat. No. 4,612,300, by sequentially |

TABLE H-continued

| Catalysts for Poly. 6, Poly. 7, Poly. 8 and Poly. 9 | |
|---|---|
| | adding to a volume of ISOPAR E, a slurry of anhydrous magnesium chloride in ISOPAR E, a solution of $EtAlCl_2$ in heptane, and a solution of Ti(O-iPr)4 in heptane, to yield a composition containing a magnesium concentration of 0.20M and a ratio of Mg/Al/Ti of 40/12.5/3. |
| Co-catalyst A | bis(hydrogenated tallow alkyl)methylammonium tetrakis(pentafluorophenyl) borate(1-) amine |
| Co-catalyst B | Aluminoxanes, iso-Bu Me, branched, cyclic and linear; modified methyl aluminoxane |

TABLE I

| | | Poly. 6 | Poly. 7 | Poly. 8 | Poly. 9 |
|---|---|---|---|---|---|
| Reactor Configuration | Type | Dual Series | Dual Series | Dual Series | Dual Series |
| Comonomer type | Type | 1-octene | 1-octene | 1-octene | 1-octene |
| First Reactor Feed Solvent/ Ethylene Mass Flow Ratio | g/g | 2.53 | 2.55 | 2.54 | 2.53 |
| First Reactor Feed Comonomer/ Ethylene Mass Flow Ratio | g/g | 0.15 | 0.16 | 0.18 | 0.21 |
| First Reactor Feed Hydrogen/ Ethylene Mass Flow Ratio | g/g | 9.63E−04 | 1.54E−03 | 1.24E−03 | 1.47E−03 |
| First Reactor Temperature | ° C. | 161 | 160 | 160 | 160 |
| First Reactor Pressure | barg | 50 | 50 | 50 | 50 |
| First Reactor Ethylene Conversion | % | 96.7 | 96.8 | 96.7 | 96.6 |
| First Reactor Catalyst Type | Type | Primary Catalyst Comp. 1 | Primary Catalyst Comp. 1 | Primary Catalyst Comp. 2 | Primary Catalyst Comp. 2 |
| First Reactor Catalyst Metal | | Zr | Zr | Zr | Zr |
| First Reactor Co-Catalyst 1 Type | Type | Co-catalyst A | Co-catalyst A | Co-catalyst A | Co-catalyst A |
| First Reactor Co-Catalyst 2 Type | Type | Co-catalyst B | Co-catalyst B | Co-catalyst B | Co-catalyst B |
| First Reactor Co-Catalyst 1 to Catalyst Molar Ratio (B to Catalyst Metal ratio) | mol/ mol | 1.3 | 1.2 | 1.2 | 1.2 |
| First Reactor Co-Catalyst 2 to Catalyst Molar Ratio (A1 to Catalyst Metal ratio) | mol/ mol | 12.2 | 12.0 | 3.0 | 2.8 |
| First Reactor Residence Time | min | 42.1 | 42.2 | 43.0 | 43.3 |
| Percentage of Total Ethylene Feed to First Reactor | wt % | 32.3% | 32.1% | 31.9% | 31.8% |
| Second Reactor Feed Solvent/ Ethylene Mass Flow Ratio | g/g | 3.61 | 3.61 | 3.60 | 3.59 |
| Second Reactor Feed Comonomer/ Ethylene Mass Flow Ratio | g/g | 0.063 | 0.060 | 0.064 | 0.073 |
| Second Reactor Feed Hydrogen/ Ethylene Mass Flow Ratio | g/g | 1.03E−05 | 1.02E−05 | 1.02E−05 | 1.02E−05 |
| Second Reactor Temperature | ° C. | 195 | 195 | 195 | 195 |
| Second Reactor Pressure | barg | 52 | 51 | 51 | 51 |
| Second Reactor Ethylene Conversion | % | 91.9 | 91.8 | 92.1 | 91.8 |
| Second Reactor Catalyst Type | Type | Primary Catalyst Comp. 3 | Primary Catalyst Comp. 3 | Primary Catalyst Comp. 3 | Primary Catalyst Comp. 3 |
| Second Reactor Catalyst Metal | | Ti | Ti | Ti | Ti |
| Second Reactor Co-Catalyst 1 Type | Type | Triethyl-aluminum | Triethyl-aluminum | Triethyl-aluminum | Triethyl-aluminum |
| Second Reactor Co-Catalyst 1 to Catalyst Molar Ratio (A1 to Catalyst Metal ratio) | mol/ mol | 4.0 | 4.0 | 4.0 | 4.0 |
| Second Reactor Residence Time | min | 5.8 | 5.8 | 5.9 | 5.9 |

Analysis of Polyethylene Samples

Figure 4:
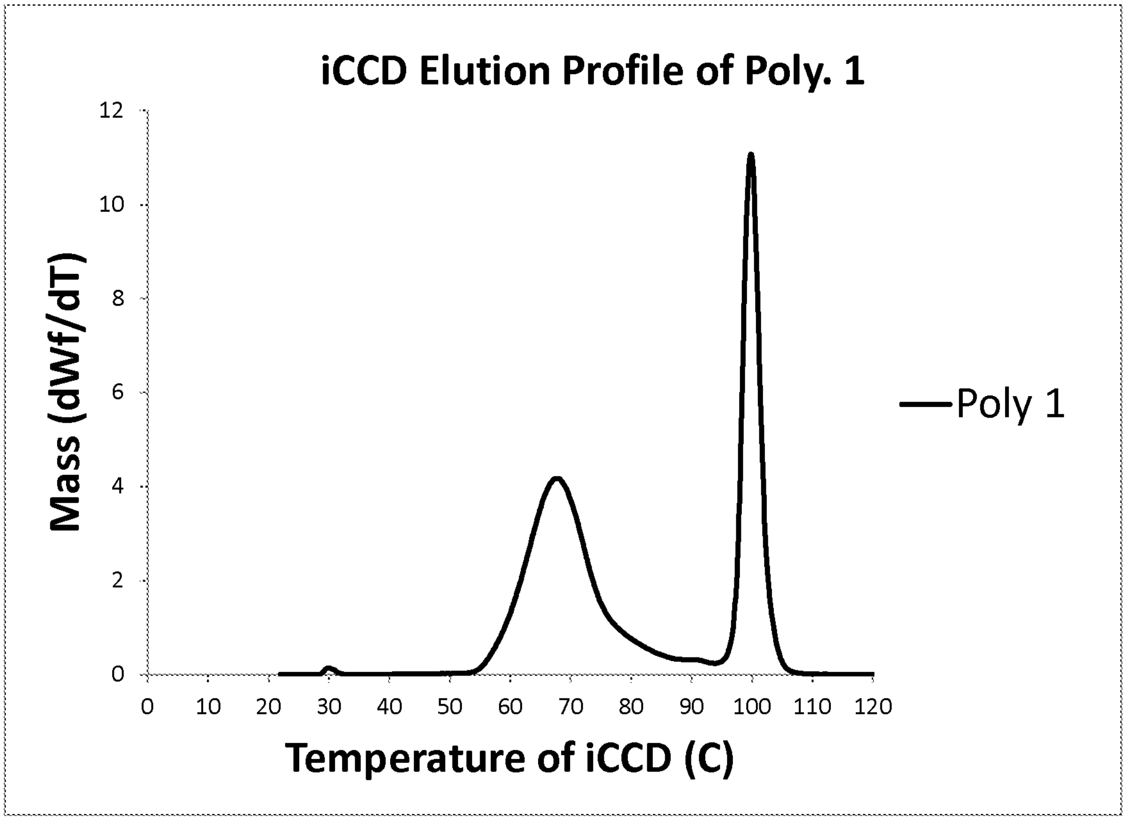
FIG. 4 is an iCCD elution profile of example Poly. 1.
Figure 5:
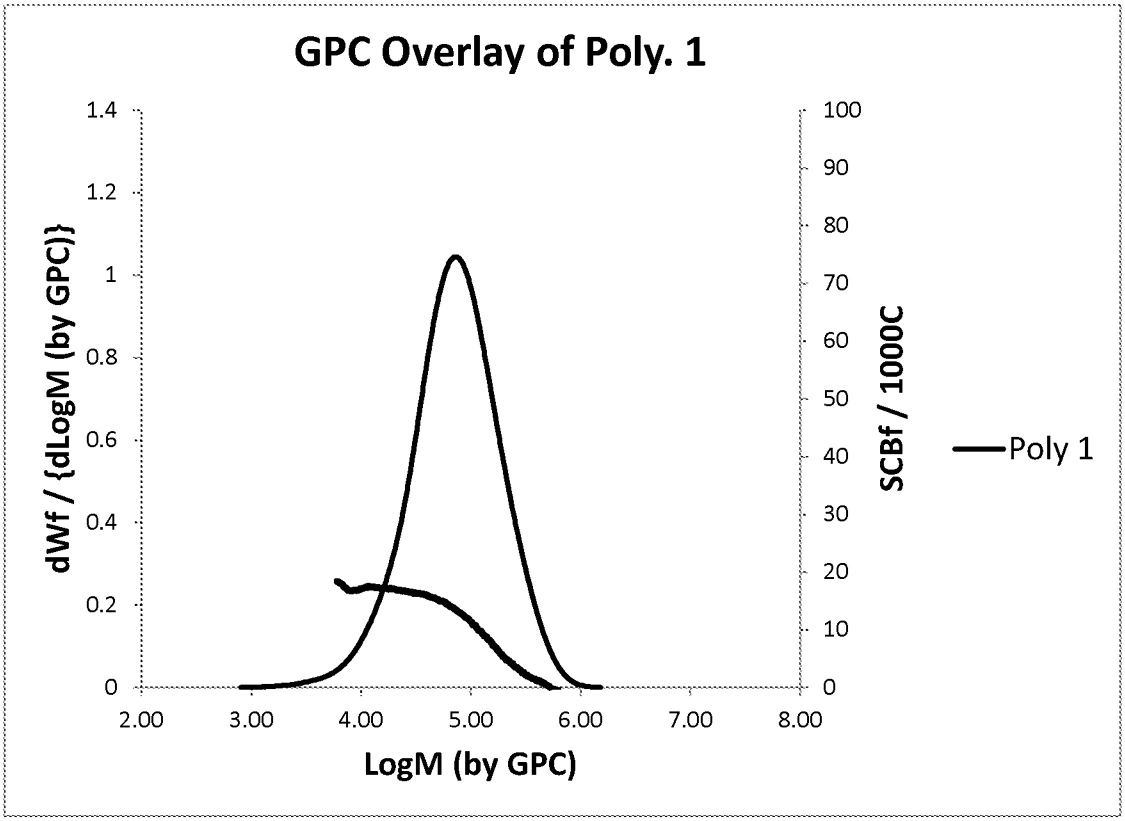
FIG. 5 is a GPC overlay of example Poly. 1.

Poly. 1-Poly. 9 are analyzed by iCCD and GPC. The density, melt index (12), MWCDI, and zero shear viscosity ratio (ZSVR) of the compositions are also measured. Data generated from the analysis and testing is reported in Tables 1 and 1A. As an example, the iCCD elution profile and GPC overlay for Poly. 1 are provided in FIG. 4 and FIG. 5, respectively.

TABLE 1

| Example | Poly. 1 | Poly. 2 | Poly. 3 | Poly. 4 | Poly. 5 |
|---|---|---|---|---|---|
| Overall Density (g/cm$^3$) | 0.920 | 0.920 | 0.926 | 0.920 | 0.918 |
| Overall Melt Index ($I_2$) | 1.0 | 1.0 | 1.7 | 1.0 | 0.85 |
| Overall ZSVR | NM* | 1.07 | 1.65 | 1.22 | 2.24 |
| Overall Mw/Mn | 2.43 | 4.85 | 3.20 | 4.21 | 3.79 |
| MWCDI | −3.50 | −5.25 | −2.20 | −0.82 | 1.02 |
| Area of Second PE Fraction (90° C. to 115° C.) | 41.6% | 34.3% | 53.64% | 21.88% | 31.76% |
| Peak Temperature of Single Peak of Second PE Fraction (90° C. to 115° C.) | 99.86° C. | 101.84° C. | 98.56° C. | 93.73° C. | 99.57° C. |
| Width of Peak of Second PE Fraction at 50% Peak Height | 3.15° C. | 2.96° C. | 8.12° C. | 16.4° C. | 13.7° C. |
| Mw of Second PE Fraction (90° C. to 115° C.) | 149,000 Dalton | 218,000 Dalton | 120,000 Dalton | 188,000 Dalton | 81,000 Dalton |

*Not measured (NM)}

TABLE 1A

| Example | Poly. 6 | Poly. 7 | Poly. 8 | Poly. 9 |
|---|---|---|---|---|
| Overall Density (g/cm$^3$) | 0.936 | 0.936 | 0.9345 | 0.9345 |
| Overall Melt Index ($I_2$) | 2.0 | 2.7 | 2.0 | 2.7 |
| Overall ZSVR | NM* | NM* | NM* | NM* |
| Overall Mw/Mn | 3.50 | 3.67 | 3.94 | 3.82 |
| MWCDI | −1.28 | −1.42 | −1.79 | −2.30 |
| Area of Second PE Fraction (90° C. to 115° C.) | 61.32% | 60.11% | 60.68% | 59.12% |
| Peak Temperature of Single Peak of Second PE Fraction (90° C. to 115° C.) | 99.05° C. | 98.82° C. | 98.93° C. | 98.97° C. |
| Width of Peak of Second PE Fraction at 50% Peak Height | 5.22° C. | 5.33° C. | 5.43° C. | 6.22° C. |
| Mw of Second PE Fraction (90° C. to 115° C.) | 139,084 Dalton | 135,010 Dalton | 141,155 Dalton | 140,343 Dalton |

*Not measured (NM)

Three layer and five layer cast stretch films are fabricated on a 5 layer Egan Davis Standard coextrusion cast film line. The cast line consists of three 2½" and two 2" 30:1 L/D Egan Davis Standard MAC extruders which are air cooled. All extruders have moderate work DSB (Davis Standard Barrier) type screws. A microprocessor monitors and controls the operations. The extrusion process is monitored by pressure transducers located before and after the breaker plate as well as four heater zones on each barrel, one each at the adapter and the block, and two zones on the die. The microprocessor also tracks the extruder RPM, % FLA, HP, rate, line speed, % draw, primary and secondary chill roll temperatures, gauge deviation, layer ratio, rate/RPM, and melt temperature for each extruder.

Equipment specifications include a Cloeren 5 layer dual plane feed block and a Cloeren 36" Epoch III autogage 5.1 die. The primary chill roll has a matte finish and is 40" O.D.×40" long with a 30-40 RMS surface finish for improved release characteristics. The secondary chill roll is 20" O.D.×40" long with a 2-4 RMS surface for improved web tracking. Both the primary and secondary chill roll has chilled water circulating through it to provide quenching. There is an X-ray gauge sensor from Scantech for gauge thickness and automatic gauge control if needed. Rate is measured by five Barron weigh hoppers with load cells on each hopper for gravimetric control. Samples are finished on the two position single turret Horizon winder on 3" I.D. cores with center wind automatic roll changeover and slitter station. The maximum throughput rate for the line is 600 pounds per hour and maximum line speed is 1200 feet per minute.

The conditions for sample preparation are as shown in Table 2.

TABLE 2

| Cast Film Line Parameters | |
|---|---|
| Melt Temperature | 550° F. |
| Temperature Profile | B1: 300° F.<br>B2: 475° F.<br>B3-B5: 550° F.<br>Screen: 550° F.<br>Adapter: 550° F.<br>Die all zones: 550° F. |
| Line Speed | 600 ft./min |
| Through Put Rate | 300 lb/hr |
| Chill Roll Temperature | 70° F. |
| Cast Roll Temperature | 70° F. |
| Air Knife | 40% blower output |
| Vacuum Box | Off |
| Die gap | 20-25 mil |

In addition to Poly. 1-Poly. 9, the following materials are also used for formulations of the inventive and comparative films:

DR376_01 ("PP"), a polypropylene commercially available from Braskem (Sao Paulo, Brazil).

ATTANE™ 4404G, an ultra low density polyethylene copolymer commercially available from The Dow Chemical Company, Midland, MI.

ELITE™ 5230G, an enhanced polyethylene resin commercially available from The Dow Chemical Company, Midland, MI.

Three layer and five layer cast stretch films are formed and designated as Inventive and Comparative Films. For each of the three layer films, ATTANE™ 4404G is used in an outer layer (Layer 1); ELITE™ 5230G is used in the other outer layer (Layer 3); and PP or Poly. 1-Poly. 5 are used in the inner layer (Layer 2). Table 3, 4 and 5 below provide the formulation for the three layer comparative and inventive examples. For Comparative Films 2-4 and Inventive Films 1, PP or Poly. 3-5 comprise 20% of the total film formulation.

TABLE 3

| | Percentage of Total Film | Comparative Film 1 |
|---|---|---|
| Layer 1 | 10% | ATTANE ™ 4404G |
| Layer 2 | 10% | PP |
| Layer 3 | 80% | ELITE ™ 5230G |

TABLE 4

| | Percentage of Total Film | Comparative Film 2 | Comparative Film 3 | Comparative Film 4 |
|---|---|---|---|---|
| Layer 1 | 10% | ATTANE ™ 4404G | ATTANE ™ 4404G | ATTANE ™ 4404G |
| Layer 2 | 20% | PP | Poly. 4 | Poly. 5 |
| Layer 3 | 70% | ELITE ™ 5230G | ELITE ™ 5230G | ELITE ™ 5230G |

TABLE 5

| Film | | |
|---|---|---|
| | Percentage of Total Film | Inventive Film 1 |
| Layer 1 | 10% | ATTANE ™ 4404G |
| Layer 2 | 20% | Poly. 3 |
| Layer 3 | 70% | ELITE ™ 5230G |

For each of the five layer films, ATTANE™ 4404G is used in an outer layer (Layer 1); ELITE™ 5230G is used in the other outer layer (Layer 5) as well as the core layer (Layer 3); and Poly. 1-Poly. 9 are used in the sub-inner layers (Layers 2 and 4). Tables 6, 7, and 7A below provide the formulation for the five layer comparative and inventive examples. For Comparative Films 5-6 and Inventive Films 2-4, Poly. 1-9 comprise 30% of the total film formulation (i.e., 15% in Layer 2 and 15% in Layer 4).

TABLE 6

| | Percentage of Total Film | Comparative Film 5 | Comparative Film 6 |
|---|---|---|---|
| Layer 1 | 10% | ATTANE ™ 4404G | ATTANE ™ 4404G |
| Layer 2 | 15% | Poly. 4 | Poly. 5 |
| Layer 3 | 30% | ELITE ™ 5230G | ELITE ™ 5230G |
| Layer 4 | 15% | Poly. 4 | Poly. 5 |
| Layer 5 | 30% | ELITE ™ 5230G | ELITE ™ 5230G |

TABLE 7

| | Percentage of Total Film | Inventive Film 2 | Inventive Film 3 | Inventive Film 4 |
|---|---|---|---|---|
| Layer 1 | 10% | ATTANE ™ 4404G | ATTANE ™ 4404G | ATTANE ™ 4404G |
| Layer 2 | 15% | Poly. 2 | Poly. 3 | Poly. 1 |
| Layer 3 | 30% | ELITE ™ 5230G | ELITE ™ 5230G | ELITE ™ 5230G |
| Layer 4 | 15% | Poly. 2 | Poly. 3 | Poly. 1 |
| Layer 5 | 30% | ELITE ™ 5230G | ELITE ™ 5230G | ELITE ™ 5230G |

TABLE 7A

| | Percentage of Total Film | Inventive Film 5 | Inventive Film 6 | Inventive Film 7 | Inventive Film 8 |
|---|---|---|---|---|---|
| Layer 1 | 10% | ATTANE ™ 4404G | ATTANE ™ 4404G | ATTANE ™ 4404G | ATTANE ™ 4404G |
| Layer 2 | 15% | Poly. 6 | Poly. 7 | Poly. 8 | Poly. 9 |
| Layer 3 | 30% | ELITE ™ 5230G | ELITE ™ 5230G | ELITE ™ 5230G | ELITE ™ 5230G |
| Layer 4 | 15% | Poly. 6 | Poly. 7 | Poly. 8 | Poly. 9 |
| Layer 5 | 30% | ELITE ™ 5230G | ELITE ™ 5230G | ELITE ™ 5230G | ELITE ™ 5230G |

Properties of the Inventive and Comparative Films are measured according to the test methods disclosed herein, and are provided in Tables 8, 9, and 9A. As can be seen from the results, Inventive Film 1 has a surprisingly high on pallet tear and time-to-break (ESTL Tear) in comparison to the Comparative Films 3 and 4. Similarly, Inventive Films 2-8 have surprisingly high on pallet tear and time-to-break (ESTL Tear) in comparison to the Comparative Films 5 and 6.

TABLE 8

| | Comparative Film 1 | Comparative Film 2 | Comparative Film 3 | Comparative Film 4 | Inventive Film 1 |
|---|---|---|---|---|---|
| Thickness (mil) | 0.6 | 0.6 | 0.6 | 0.6 | 0.6 |
| On Pallet Tear (lbs.) | 11.6 | 13.7 | 0 | 0 | 11 |
| Time-to-Break (seconds) | 9.96 | 15.16 | 3.44 | 0 | 7.41 |
| On Pallet Puncture-Type A (lbs.) | 12.2 | 12.2 | 0 | 0 | 10.5 |
| On Pallet Puncture-Type B (lbs.) | 10.0 | 12.50 | NM* | NM* | NM* |

TABLE 8-continued

| | Comparative Film 1 | Comparative Film 2 | Comparative Film 3 | Comparative Film 4 | Inventive Film 1 |
|---|---|---|---|---|---|
| Ultimate Stretch (%) | 357 | 418 | 317 | 405 | 360 |

*Not Measured

TABLE 9

| | Comparative Film 5 | Comparative Film 6 | Inventive Film 2 | Inventive Film 3 | Inventive Film 4 |
|---|---|---|---|---|---|
| Thickness (mil) | 0.6 | 0.6 | 0.6 | 0.6 | 0.6 |
| On Pallet Tear (lbs.) | 9.6 | 7.67 | 16.8 | 11.33 | 12.33 |
| Time-to-Break (seconds) | 2.3 | 0.98 | 22.9 | 8.98 | 10.0 |
| On Pallet Puncture-Type A (lbs.) | 11.8 | 12 | 11.7 | 12.6 | NM* |
| On Pallet Puncture-Type B (lbs.) | NM* | NM* | NM* | NM* | 10.17 |
| Ultimate Stretch (%) | 273.3 | 323 | 350 | 447 | 340 |

*Not Measured

TABLE 9A

| | Inventive Film 5 | Inventive Film 7 | Inventive Film 7 | Inventive Film 8 |
|---|---|---|---|---|
| Thickness (mil) | 0.6 | 0:6 | 0.6 | 0.6 |
| On Pallet Tear (lbs.) | 10.5 | 11 | 11 | 12 |
| Time-to-Break (seconds) | 8.1 | 7.6 | 7.3 | 9.0 |
| On Pallet Puncture-Type A (lbs.) | NM* | NM* | NM* | NM* |
| On Pallet Puncture-Type B (lbs.) | 10.5 | NM* | 10.5 | 10.0 |
| Ultimate Stretch (%) | 327 | 287 | 303 | 323 |

*Not Measured

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A polyethylene composition characterized by having the following:

(a) a density of from 0.910 to 0.945 g/cm$^3$;

(b) a melt index ($I_2$) of from 0.5 to 7.0 g/10 min;

(c) a first polyethylene fraction having a single peak in a temperature range of from 40° C. to 85° C. in an elution profile via improved comonomer composition distribution (iCCD) analysis method;

(d) a second polyethylene fraction having a single peak in a temperature range of from 90° C. to 115° C. in the elution profile via iCCD analysis method, and wherein a second polyethylene area fraction is an area in the elution profile beneath the peak of the second polyethylene fraction between 90° C. and 115° C., and wherein the second polyethylene area fraction comprises at least 30% of the total area of the elution profile, and wherein the width of the peak of the second polyethylene fraction at 50 percent peak height is less than 4.0° C.; and (e) a molecular weighted comonomer distribution index (MWCDI) value of less than 0.

2. The polyethylene composition of claim 1, wherein the MWCDI value is less than −3.

3. The polyethylene composition of claim 1, wherein the second polyethylene fraction has a weight average molecular weight (Mw) of at least 95,000 g/mol.

4. The polyethylene composition of claim 1, wherein the polyethylene composition is further characterized by having a molecular weight distribution, expressed as the ratio of the weight average molecular weight to number average molecular weight (Mw/Mn), in the range of from 2.0 to 8.0.

5. The polyethylene composition of claim 1, wherein the polyethylene composition is further characterized by having a zero shear viscosity ratio (ZSVR) of less than 3.0.

6. The polyethylene composition of claim 1, wherein the first polyethylene fraction of the polyethylene composition is formed in the presence of a first molecular catalyst and the second polyethylene fraction of the polyethylene composition is formed in the presence of a second molecular catalyst.

7. A cast stretch film comprising a polyethylene composition characterized by having the following:

(a) a density of from 0.910 to 0.945 g/cm$^3$;

(b) a melt index ($I_2$) of from 0.5 to 7 g/10 min;

(c) a first polyethylene fraction having a single peak in a temperature range of from 40° C. to 85° C. in an elution profile via improved comonomer composition distribution (iCCD) analysis method;

(d) a second polyethylene fraction having at least one peak in a temperature range of from 90° C. to 115° C. in the elution profile via iCCD analysis method, and wherein a second polyethylene area fraction is an area in the elution profile beneath the peak of the second polyethylene fraction between 90° C. and 115° C., and wherein the second polyethylene area fraction comprises at least 30% of the total area of the elution profile; and (e) a MWCDI value of less than 0.

8. The cast stretch film of claim 7, wherein the width of the peak of the second polyethylene fraction at 50 percent peak height is less than 4.0° C.

9. The cast stretch film of claim 7, wherein the cast stretch film has an on pallet tear of from 10.0 to 20.0 lbs. at 0.6 mil thickness and 20 inch film width.

10. The cast stretch film of claim 7, wherein the cast stretch film has an average time-to-break of at least 5 seconds.

* * * * *